(12) United States Patent
Noguchi

(10) Patent No.: US 11,062,122 B2
(45) Date of Patent: Jul. 13, 2021

(54) IMAGE CANDIDATE DETERMINATION APPARATUS, IMAGE CANDIDATE DETERMINATION METHOD, PROGRAM FOR CONTROLLING IMAGE CANDIDATE DETERMINATION APPARATUS, AND RECORDING MEDIUM STORING PROGRAM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/819,426

(22) Filed: Mar. 16, 2020

(65) Prior Publication Data

US 2020/0257887 A1    Aug. 13, 2020

Related U.S. Application Data

(63) Continuation of application No. PCT/JP2018/032593, filed on Sep. 3, 2018.

(30) Foreign Application Priority Data

Oct. 2, 2017 (JP) .............................. JP2017-192890
Apr. 5, 2018 (JP) .............................. JP2018-073377

(51) Int. Cl.
  *G06K 9/00* (2006.01)
(52) U.S. Cl.
  CPC ..... *G06K 9/00228* (2013.01); *G06K 9/00268* (2013.01)

(58) Field of Classification Search
  CPC ........... G06K 9/00228; G06K 9/00268; G06K 9/00255; G06T 7/408
  See application file for complete search history.

(56) References Cited

U.S. PATENT DOCUMENTS

| 2011/0221922 A1 | 9/2011 | Matsumoto et al. |
| 2012/0013764 A1* | 1/2012 | Sakai ................ H04N 9/73 348/223.1 |
| 2012/0013782 A1 | 1/2012 | Mori |
| 2013/0243273 A1 | 9/2013 | Yamaji et al. |

(Continued)

FOREIGN PATENT DOCUMENTS

| JP | 2010-057073 A | 3/2010 |
| JP | 2012-23501 A | 2/2012 |

(Continued)

OTHER PUBLICATIONS

International Search Report issued in PCT/JP2018/032593; dated Oct. 30, 2018.

(Continued)

*Primary Examiner* — Md K Talukder
(74) *Attorney, Agent, or Firm* — Studebaker & Brackett PC

(57) ABSTRACT

In a case where a plurality of images are input, images in which the same person is included are grouped. In a case where there are images of which the number is equal to or larger than a maximum number of images to be made public for the same person, a total image evaluation value is calculated for the images in which the same person is included. An image with a small total image evaluation value is determined as a private image candidate so that the number thereof is smaller than the maximum number.

17 Claims, 25 Drawing Sheets

(56) References Cited

U.S. PATENT DOCUMENTS

| | | | | |
|---|---|---|---|---|
| 2015/0294137 A1* | 10/2015 | Miyazaki | ................ | G06F 16/00 |
| | | | | 382/190 |
| 2018/0164964 A1* | 6/2018 | Hori | ........................ | G06K 9/46 |
| 2020/0234076 A1* | 7/2020 | Katsumata | ................ | G06F 3/14 |
| 2020/0257887 A1* | 8/2020 | Noguchi | ............ | G06K 9/00268 |
| 2020/0311464 A1* | 10/2020 | Raichelgauz | ........ | G06K 9/6228 |

FOREIGN PATENT DOCUMENTS

| | | |
|---|---|---|
| JP | 2013-191035 A | 9/2013 |
| JP | 2014-102715 A | 6/2014 |
| JP | 2014-109864 A | 6/2014 |
| JP | 5616819 B2 | 10/2014 |

OTHER PUBLICATIONS

International Preliminary Report on Patentability and Written Opinion issued in PCT/JP2018/032593; dated Apr. 8, 2020.
The extended European search report issued by the European Patent Office dated Oct. 29, 2020, which corresponds to European Patent Application No. 18865004.8-1207 and is related to U.S. Appl. No. 16/819,426.
An Office Action; "Notice of Reasons for Refusal", mailed by the Japanese Patent Office dated May 18, 2021, which corresponds to Japanese Patent Application No. 2019-546580 and is related to U.S. Appl. No. 16/819,426; with English language translation.

* cited by examiner

IMAGE CANDIDATE DETERMINATION APPARATUS, IMAGE CANDIDATE DETERMINATION METHOD, PROGRAM FOR CONTROLLING IMAGE CANDIDATE DETERMINATION APPARATUS, AND RECORDING MEDIUM STORING PROGRAM

CROSS-REFERENCE TO RELATED APPLICATIONS

This application is a Continuation of PCT International Application No. PCT/JP2018/032593 filed on Sep. 3, 2018, which claims priority under 35 U.S.C. § 119(a) to Japanese Patent Application No. 2017-192890 filed on Oct. 2, 2017, and Japanese Patent Application No. 2018-073377 filed on Apr. 5, 2018. Each of the above application(s) is hereby expressly incorporated by reference, in its entirety, into the present application.

BACKGROUND OF THE INVENTION

1. Field of the Invention

The present invention relates to an image candidate determination apparatus, an image candidate determination method, a program for controlling the image candidate determination apparatus, and a recording medium storing the program.

2. Description of the Related Art

At events such as graduation ceremonies or sports day, many children are imaged, and albums or the like are created. For this purpose, for example, a school photo management server capable of centrally managing, browsing, and ordering all photos taken in a school, student's works, or the like is considered (JP2014-102715A). Further, in creating an album, a method for preventing the number of photographic images taken by a specific individual from becoming extremely large or small is considered. For this purpose, images are selected from list images, a person is extracted from the selected images, the number of appearances of the extracted person is counted, and in a case where the number of appearances exceeds five, a warning is displayed. In a case where the warning is displayed, a user selects an image to be deleted among the selected images (JP2010-057073A). Further, an image publishing device capable of automatically determining, even though a user does not set a public state or a private state, the public state or the private state according to a predetermined rule is also considered (JP2013-191035A). Furthermore, a method for imaging a plurality of subjects in a balanced manner is also considered (JP5616819B).

SUMMARY OF THE INVENTION

Energetic children or conspicuous children appear in many photos, while shy children or quiet children do not appear in the photos. In the technique disclosed in JP2014-102715A, there is a possibility that in a case where photos are sold in such a state, complaints of unfairness may be raised from guardians. In the technique disclosed in JP2010-057073A, in a case where an image to be deleted is selected from selected images, it is difficult to determine which image is to be selected. In the technique disclosed in JP2013-191035A, images are determined to be made public or private on the basis of an image analysis result, in which the number of images including a specific person may increase, or may decrease. Further, in the technique disclosed in JP5616819B, a plurality of subjects are merely imaged in a balanced manner during imaging.

An object of the invention is to provide a technique that assists which image is to be selected in order to uniformize the number of images that includes each person in images that is made public as much as possible.

According to an aspect of the invention, there is provided an image candidate determination apparatus comprising: image grouping means for receiving a plurality of images and grouping one or more images in which the same person is included; and image candidate determination means for determining an extraction image candidate or a non-extraction image candidate from the images grouped by the image grouping means, on the basis of a total image evaluation value and a limit value of an extraction number of images in which the same person is included.

Here, the grouping means may be any means as long as the image candidate determination apparatus can recognize one or more images in which the same person is included. For example, the grouping means may be stored in a certain folder, or a certain flag may be set therefor.

Further, the image candidate determination apparatus according to the invention may comprise a processor that receives a plurality of images, groups one or more images in which the same person is included, and determines an extraction image candidate or a non-extraction image candidate from the grouped images, on the basis of a total image evaluation value and a limit value of an extraction number of images in which the same person is included.

According to another aspect of the invention, there is provided an image candidate determination method suitable for the image candidate determination apparatus. That is, the method comprises receiving a plurality of images and grouping one or more images in which the same person is included, by image grouping means; and determining an extraction image candidate or a non-extraction image candidate from the images grouped by the image grouping means, on the basis of a total image evaluation value and a limit value of an extraction number of images in which the same person is included, by image candidate determination means.

Further, according to still another aspect of the invention, there are provided a computer-readable program for controlling a computer of the image candidate determination apparatus, and a recording medium storing the program.

The image candidate determination apparatus may further comprise an image candidate display control means that displays the extraction image candidate or the non-extraction image candidate determined by the image candidate determination means on the display screen.

The total image evaluation value may be calculated on the basis of a person image evaluation value calculated for each person who appears in the images, for example.

The person image evaluation value is calculated on the basis of an evaluation value relating to at least a face, for example. In this case, the image candidate determination apparatus further comprises face image portion extraction means for extracting a face image portion from each of a plurality of images, the image grouping means groups the face image portions extracted by the face image portion extraction means for each face image portion of the same person, and the image candidate determination means determines the extraction image candidate or the non-extraction image candidate from the images grouped by the image grouping means, for example, on the basis of the total image evaluation value and the limit value of the extraction number of images in which the same person is included.

The image candidate determination apparatus may further comprise correction means for correcting the person image evaluation value using a correction coefficient for setting the person image evaluation value to be larger as the number of images in which the same person is included is smaller.

The image candidate determination apparatus may further comprise image determination means for determining an extraction image or a non-extraction image from the extraction image candidates displayed under control of the image candidate display control means, or determining a non-extraction image or an extraction image from the non-extraction image candidates displayed under control of the image candidate display control means.

The image candidate determination apparatus may further comprise notification means for notifying the number of the extraction images and the number of the non-extraction images determined by the image determination means, for each person included in the images.

The image candidate determination apparatus may further comprise notification means for updating and notifying, in a case where a plurality of images are defined as extraction images or non-extraction images that are set in advance for each person included in the images, the number of extraction images and the number of non-extraction images in accordance with the determination of the extraction images or the non-extraction images by the image determination means, for each person included in the images.

Further, the image candidate determination apparatus may further comprise image candidate stopping means for excluding, in a case where an extraction number of images in which a specific person is included deviates from a limit value as one non-extraction image candidate determined by the image candidate determination means becomes a non-extraction image or one extraction image candidate becomes an extraction image determined by the image candidate determination means, the one non-extraction image candidate or the one extraction image candidate from the non-extraction image candidates or the extraction image candidates.

The image grouping means regards non-same person as the same person for adults, for example, and performs grouping for respective images.

The image candidate determination apparatus may further comprise first evaluation value calculating means for calculating a lower person image evaluation value as the number of persons included in an image is larger.

For example, the image candidate determination means may determine, on the basis of the total image evaluation value and the limit value of the extraction number of images in which the same person is included, the extraction image candidate or the non-extraction image candidate from the images grouped by the image grouping means so that an extraction number of images in which the same person is included is within the limit value.

The image candidate determination apparatus may further comprise person detecting means for detecting a person for which the number of the same person included in one or more images grouped by the image grouping means is equal to or smaller than a threshold value, and imaging instruction means for performing an imaging instruction of the person detected by the person detecting means.

According to the invention, a plurality of images are received, and one or more images in which the same person is included are grouped. On the basis of a total image evaluation value and a limit value (the limit value refers to an upper limit value, a lower limit value, or the like) of an extraction number of images in which the same person is included, an extraction image candidate (the extraction image candidate refers to a candidate for an image suitable for a user to extract from the images) or a non-extraction image candidate (the non-extraction image candidate refers to a candidate for an image suitable for the user not to extract from the images) is determined. Since the extraction image candidate or the non-extraction image candidate is determined, the user can understand which image is preferably extracted or which image is preferably not extracted. For this reason, the user can designate an image to be extracted from the images that are preferably considered to be extracted, or can designate an image that is not to be extracted from the images that are not preferably considered to be extracted.

BRIEF DESCRIPTION OF THE DRAWINGS

FIG. 11 is a diagram showing an example of an image display window.

FIG. 13 is a diagram showing an example of an image display window.

FIG. 14 is a diagram showing an example of an image display window.

FIG. 15 is a diagram showing an example of an image display window.

FIG. 16 is a diagram showing an example of an image display window.

FIG. 17 is a diagram showing an example of an image display window.

FIG. 18 is a diagram showing an example of an image display window.

FIG. 21 is a diagram showing an example of an image display window.

FIG. 27 is a diagram showing an example of an image display window.

DESCRIPTION OF THE PREFERRED EMBODIMENTS

Figure 1:
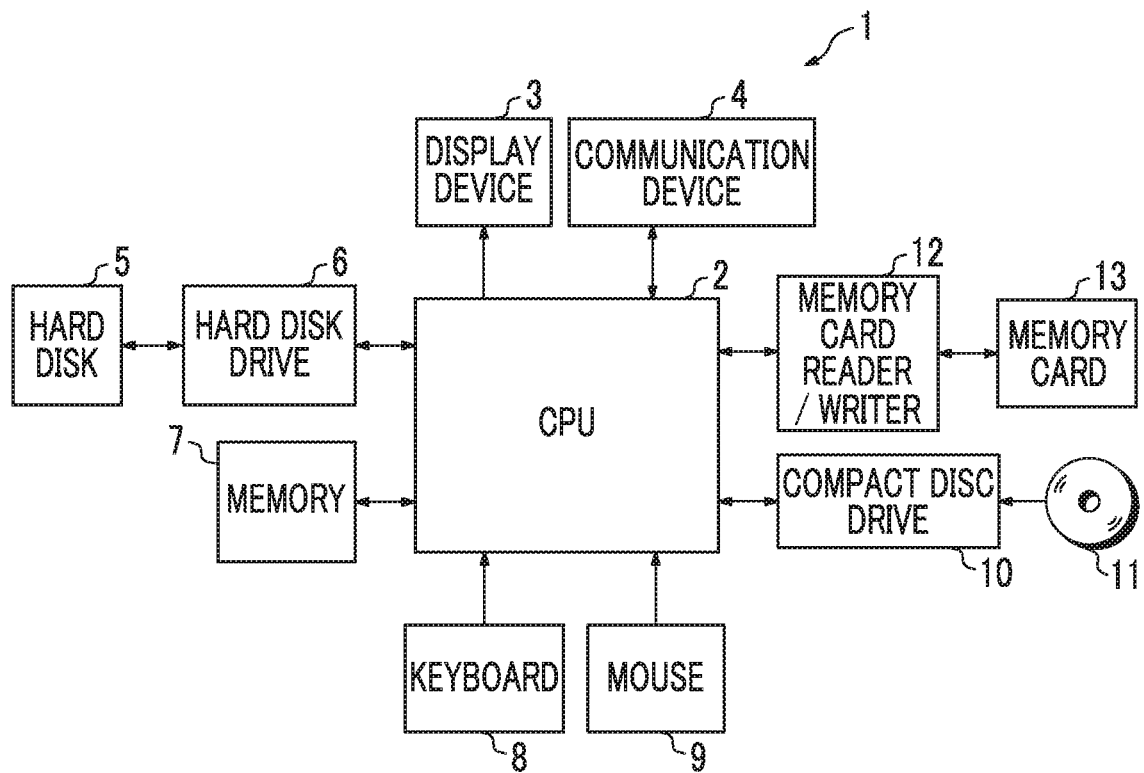
FIG. 1 is a block diagram showing an electric configuration of an image candidate determination apparatus.

FIG. 1 shows an embodiment of the invention, which is a block diagram showing an electric configuration of an image candidate determination apparatus 1.

An overall operation of the image candidate determination apparatus 1 is controlled by a central processing unit (CPU) 2.

The image candidate determination apparatus 1 includes a display device 3 that displays images and other information on a display screen, and a communication device 4 that communicates with devices other than the image candidate determination apparatus 1 by being connected to the Internet and other networks. Further, the image candidate determination apparatus 1 also includes a hard disk 5, a hard disk drive 6 that accesses the hard disk 5, a memory 7 that stores data or the like, and a keyboard 8 and a mouse 9 for inputting commands or the like. In addition, the image candidate determination apparatus 1 includes a compact disc drive 10 that accesses a compact disc 11, and a memory card reader/writer 12 that writes data on a memory card 13 and reads data recorded on the memory card 13.

An operation program of the image candidate determination apparatus 1 to be described later is received by the communication device 4 through the Internet. The received operation program is installed in the image candidate determination apparatus 1. The operation program may be received by the image candidate determination apparatus 1 through a network such as the Internet, may be recorded on a portable recording medium such as the compact disc 11 without being installed in the image candidate determination apparatus 1, and then, may be read from the portable recording medium. In this case, the operation program read from the portable recording medium is installed in the image candidate determination apparatus 1. It goes without saying that the operation program is readable by a computer (CPU 2) of the image candidate determination apparatus 1.

FIGS. 2 to 7 are flowcharts showing a processing procedure of the image candidate determination apparatus 1.

In this embodiment, in a case where a large number of images including a person are captured and the images are made public, such an imbalance that the number of images of a specific person is large or small is eliminated as much as possible.

In this embodiment, names of persons that are imaging targets are registered in the image candidate determination apparatus 1 by a user of the image candidate determination apparatus 1. In the embodiment to be described below, a large number of images are captured at a kindergarten graduation ceremony. In this embodiment, names of children that are imaging targets are registered in the image candidate determination apparatus 1 in advance by a user (for example, a kindergarten teacher).

Figure 2:
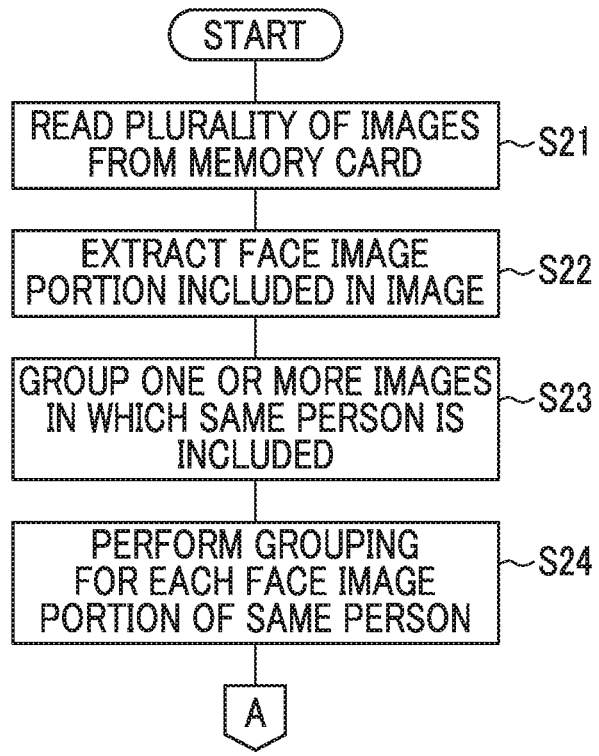
FIG. 2 is a flowchart showing a processing procedure of the image candidate determination apparatus.

In a case where the memory card 13 in which image data indicating a plurality of images is stored is loaded in the image candidate determination apparatus 1, the image data indicating the plurality of images stored in the memory card 13 is read by the memory card reader/writer 12 (step S21 in FIG. 2). A face image portion included in the image represented by the read image data is extracted by the CPU 2 (face image portion extraction means) (step S22 in FIG. 2). Further, on the basis of the extracted face image portion, one or more images including the same person are grouped by the CPU 2 (image grouping means) (step S23 in FIG. 2). The same image may belong to different groups, or the same image may belong to only one group. In addition, the extracted face image portions are also grouped for each face image portion of the same person by the CPU 2 (image grouping means) (step S24 in FIG. 2).

Figure 8:
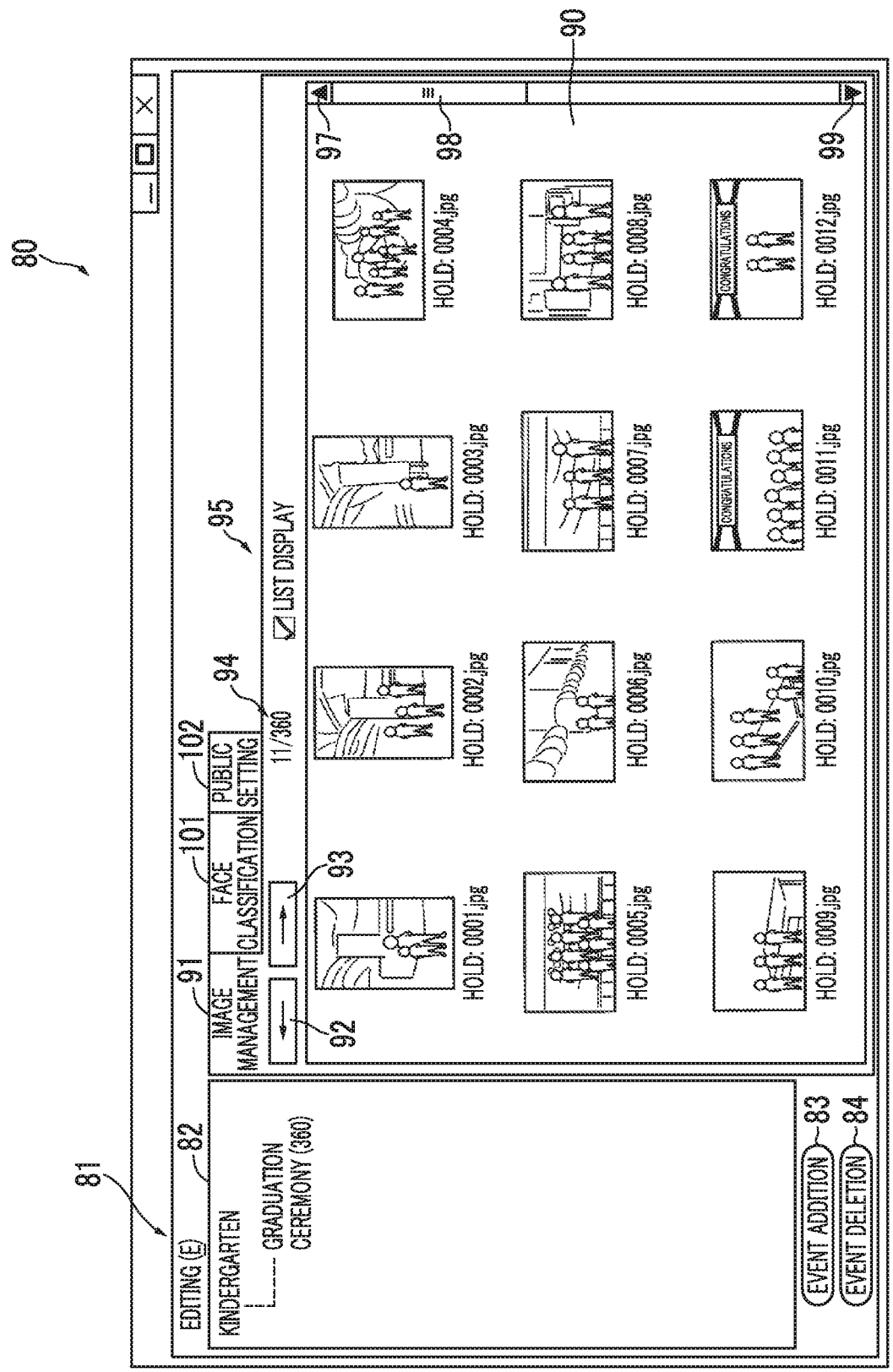
FIG. 8 is a diagram showing an example of an image display window.

An image display window 80 shown in FIG. 8 is displayed on a display screen of the display device 3. The image display window 80 includes an image management tab 91, a face classification tab 101, and a public setting tab 102, and is initially in a state where the image management tab 91 is clicked. On the image display window 80, a large number of images (thumbnail images) represented by image data read from the memory card 13 are displayed in an image display area 90 as a list (step S25 in FIG. 3).

Referring to FIG. 8, a character string 81 of "editing" is displayed on the image display window 80, and an event management area 82 is formed under the character string 81 of "editing". In the event management area 82, a character string of "graduation ceremony" is displayed below a character string of "kindergarten". Below the event management area 82, an event addition button 83 in which a character string of "event addition" is displayed and an event deletion button 84 in which a character string of "event deletion" is displayed are formed.

An event of "graduation ceremony" is generated in the event management area 82, and the images represented by the image data read from the memory card 13 are managed as the event of "graduation ceremony". Specifically, in a case where the event addition button 83 is clicked after the character string of "kindergarten" is clicked, an event input window appears on the image display window 80, and the user inputs a new event using the event input window. In a case where the user inputs the character string of "graduation ceremony" using a keyboard 8 at that time, the character string of "graduation ceremony" is displayed below the character string of "kindergarten".

As the images represented by the image data read from the memory card 13 are dragged and dropped in the image display area 90 in a state where the character string of "graduation ceremony" is clicked, the dragged and dropped images are managed under the event of "graduation ceremony" (this state is the state shown in FIG. 8). In FIG. 8, a numeral of "360" is displayed in a parenthesis on a right side of the character string of "graduation ceremony" displayed in the event management area 82, and 360 images are managed as images of the event of "graduation ceremony". In a case where the event deletion button 84 is clicked after the character string displayed in the event management area 82 is clicked, the event specified by the clicked character string and the images managed under the event are deleted.

A left arrow button 92 and a right arrow button 93 are formed under the image management tab 91. An image specifying number 94 for specifying a designated image is displayed on a right side of the right arrow button 93. A numeral represented by the image specifying number 94 represents the designated image. In the example shown in FIG. 8, since a character string of "11/360" is displayed in the image specifying number 94, it shows that an eleventh image among the 360 images managed under the event of "graduation ceremony" is designated. The image specifying number 94 is represented by a fraction, in which the denominator indicates the number of sheets managed under the event and the numerator specifies a designated image in the order of numbers. In a case where the left arrow button 92 is clicked once, the numerator of the image specifying number 94 decreases by one, and in a case where the right arrow button 93 is clicked once, the numerator of the image specifying number 94 increases by one. It is preferable to cause the user to recognize the specified image by surrounding an image specified by the image specifying number 94 by a frame, for example.

On a right side of the image specifying number 94, a character string 95 of "list display" is displayed. In a case where a check box on a left side of the character string 95 of "list display" is checked (the check box is checked in an initial state), a plurality of images are displayed in the image display area 90 as a list, as shown in FIG. 8. In a case where the check box on the left side of the character string 95 of "list display" is removed, one image specified by the image specifying number 94 is displayed in the image display area 90 (see FIG. 9).

Under each of the plurality of images displayed in the image display area 90, a public status and an image file name are displayed. In this embodiment, there are three types of public statuses such as "public", "private", and "hold". The "public" among the public statuses represents a state where an image is released, the "private" among the public statuses represents a state where an image is not released, and the "hold" among the public statuses represents a state where either the "public" or "private" is not determined. For example, a user creates an album using only "public" images, or prints only the "public" images.

At a right end portion of the image display area 90, an up arrow button 97, a slide bar 98, and a down arrow button 99 are formed. As the up arrow button 97 is clicked or the slide bar 98 is dragged upward, the image display area 90 is scrolled upward, and as the down arrow button 99 is clicked or the slide bar 98 is dragged downward, the image display area 90 is scrolled downward.

Figure 3:
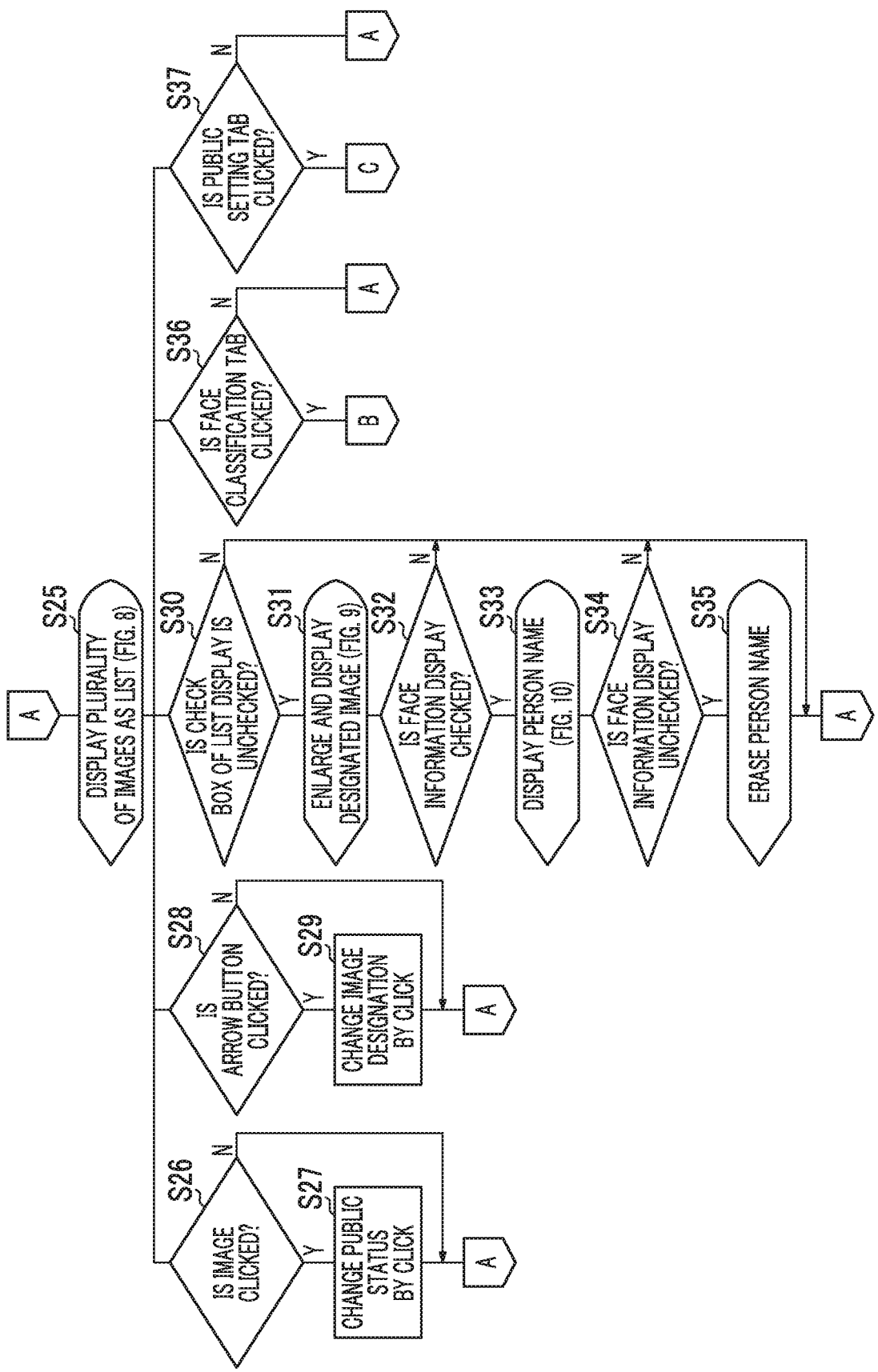
FIG. 3 is a flowchart showing a processing procedure of the image candidate determination apparatus.

In a case where a certain image among the images displayed in the image display area 90 is clicked (YES in step S26 of FIG. 3), the public status of the clicked image is changed by the click (step S27 of FIG. 3). In an initial state, public statuses of all images are set to "hold". In a case where an image in which the public status is set to "hold" is clicked once, the public status is changed to "public", and an image in which the public status is set to "public" is clicked once again, the public status is changed to "private". In a case where an image in which the public status is set to "private" is clicked once again, the public status is changed to "hold". Whenever the image is clicked in this way, the public status is sequentially changed. Here, a configuration in which "hold" is removed from the public statuses and the public statuses include "public" and "private" may be used. In this case, in an initial state, the public statuses of all the images are set to "public" or "private" (an extraction image or a non-extraction image is defined in advance for each person included in an image), and the public status is switched between "public" and "private" in accordance with image click (determination of the extraction image or the non-extraction image).

In a case where the left arrow button 92 or the right arrow button 93 is clicked (YES in step S28 of FIG. 3), the numerator of the image specifying number 94 decreases by one in a case where the left arrow button 92 is clicked, and the numerator of the image specifying number 94 increases by one in a case where the right arrow button 93 is clicked, so that the designation of the image is changed (step S29 of FIG. 3).

In a case where the check box of the character string 95 in the list display is unchecked (YES in step S30 in FIG. 3), the image specified by the image specifying number 94 is enlarged and displayed in the image display area 90 (step S31 of FIG. 3).

Figure 9:
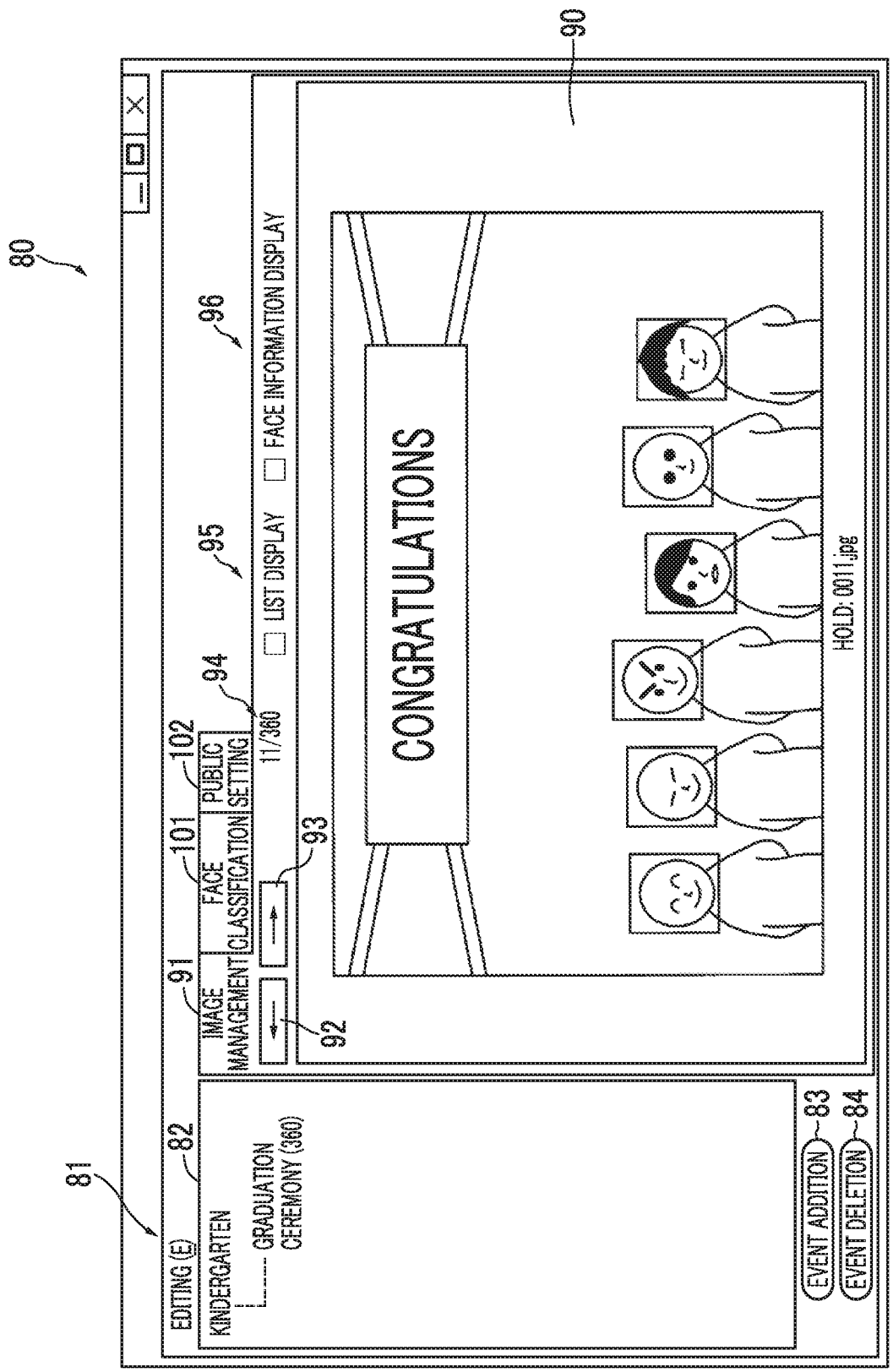
FIG. 9 is a diagram showing an example of an image display window.

FIG. 9 shows a state where an image is enlarged and displayed in the image display area 90.

In FIG. 9, the same reference numerals are given to the same configurations as those shown in FIG. 8, and description thereof will not be repeated.

A character string 96 of "face information display" is displayed on a right side of the character string 95 of "list display". A check box is also formed on a left side of the character string 96 of "face information display".

In the example shown in FIG. 9, in a case where the character string of "11/360" is displayed in the image specifying number 94 in FIG. 8, it is assumed that the check box of the character string 95 of "list display" is unchecked. Then, an image file name of "0011.jpg" specified by the "11/360" character string is enlarged and displayed in the image display area 90 shown in FIG. 9. The public status (hold) and the image file name (0011.jpg) are displayed under the image that is enlarged and displayed in the image display area 90.

In a case where the check box on the left side of the "face information display" character string 96 is checked (YES in step S32 of FIG. 3), a face frame surrounding a face image portion included in the image displayed in the image display area 90 is displayed (step S33 in FIG. 3). The display of the face frame is performed on the basis of a face image portion extraction process (step S22 of FIG. 2). A name of a subject (in this case, a kindergarten student) who is a target is input from the user of the image candidate determination apparatus 1 (in this case, a kindergarten teacher), and which person a certain face image belongs to is specified by the user, which will be described in detail later (see FIGS. 11 and 12, etc.). A face image of the same person as the face of the name specified by the user is found in the image candidate determination apparatus 1, and the found face image is also associated with the name (for example, the name of the face is stored in a header of an image file in correspondence with position information of the face). In a case where the association of the face image and the name is already performed by such processing of the user, the name of the person of the face is also displayed in correspondence with the face frame.

Figure 10:
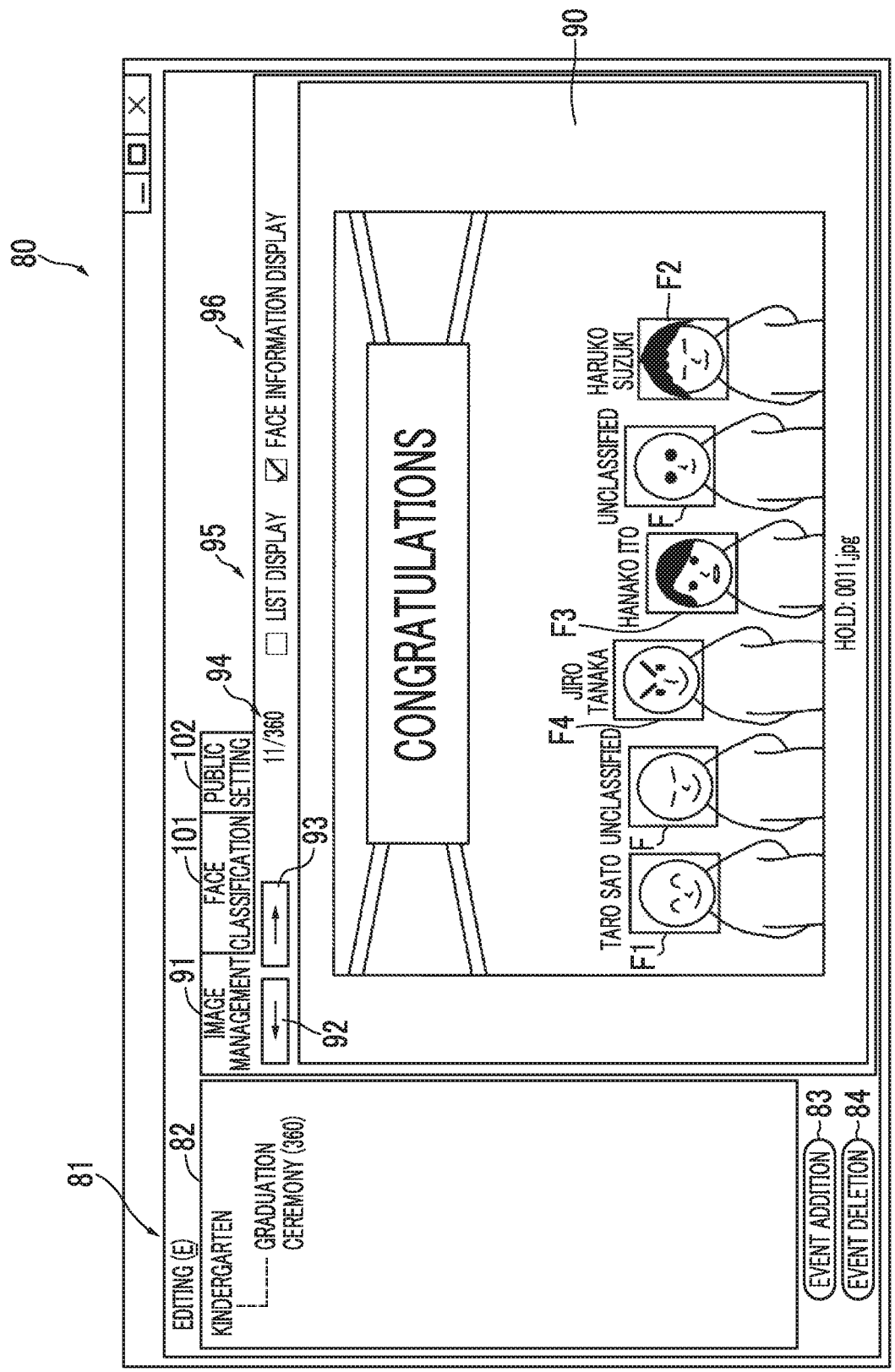
FIG. 10 is a diagram showing an example of an image display window.

FIG. 10 shows a state where the check box on the left side of the face information display character string 96 is checked and the face image portion included in the image displayed in the image display area 90 is surrounded by the face frame.

Faces surrounded by face frames F1, F4, F3, and F2 respectively correspond to persons (students) with names "Taro SATO", "Jiro TANAKA", "Hanako ITO", and "Haruko SUZUKI", and the names are respectively displayed near (above) the respective face frames F1, F4, F3, and F2. Since a face surrounded by a face frame F is not given association with a name by the user (unclassified), the name is not displayed. As the check box on the left side of the character string 96 of face information display is checked, the name of the person included in the image is displayed, and thus, it is possible for the user to confirm the name of the person included in the image.

In a case where the check box on the left side of the face information display character string 96 is unchecked (YES in step S34 of FIG. 3), the face included in the image is surrounded by the frame as shown in FIG. 10, with respect to the face associated with the name, a state where the name is displayed returns to a state where the name is erased as shown in FIG. 9 (step S35 in FIG. 3).

Figure 4:
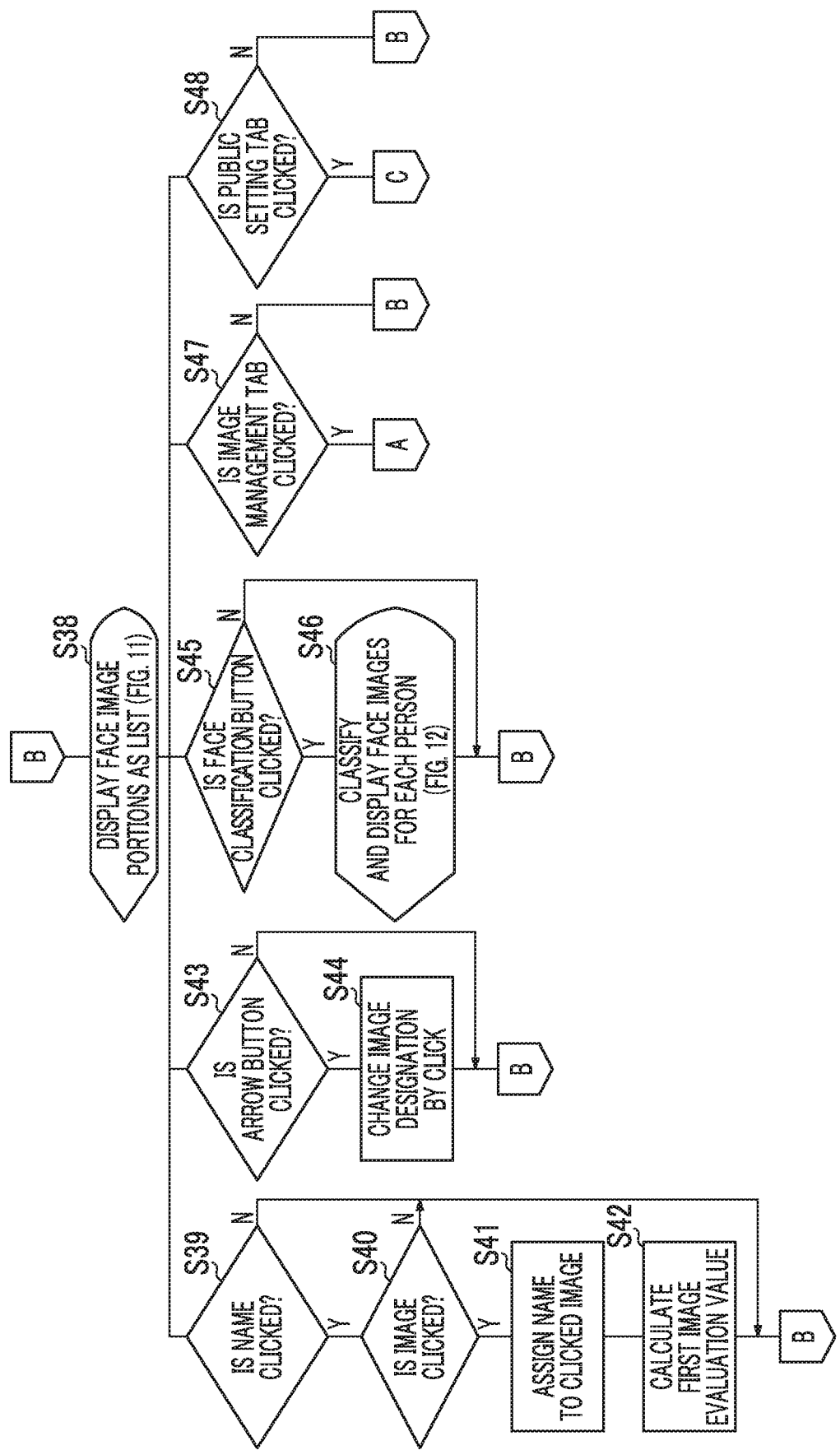
FIG. 4 is a flowchart showing a processing procedure of the image candidate determination apparatus.
Figure 11:
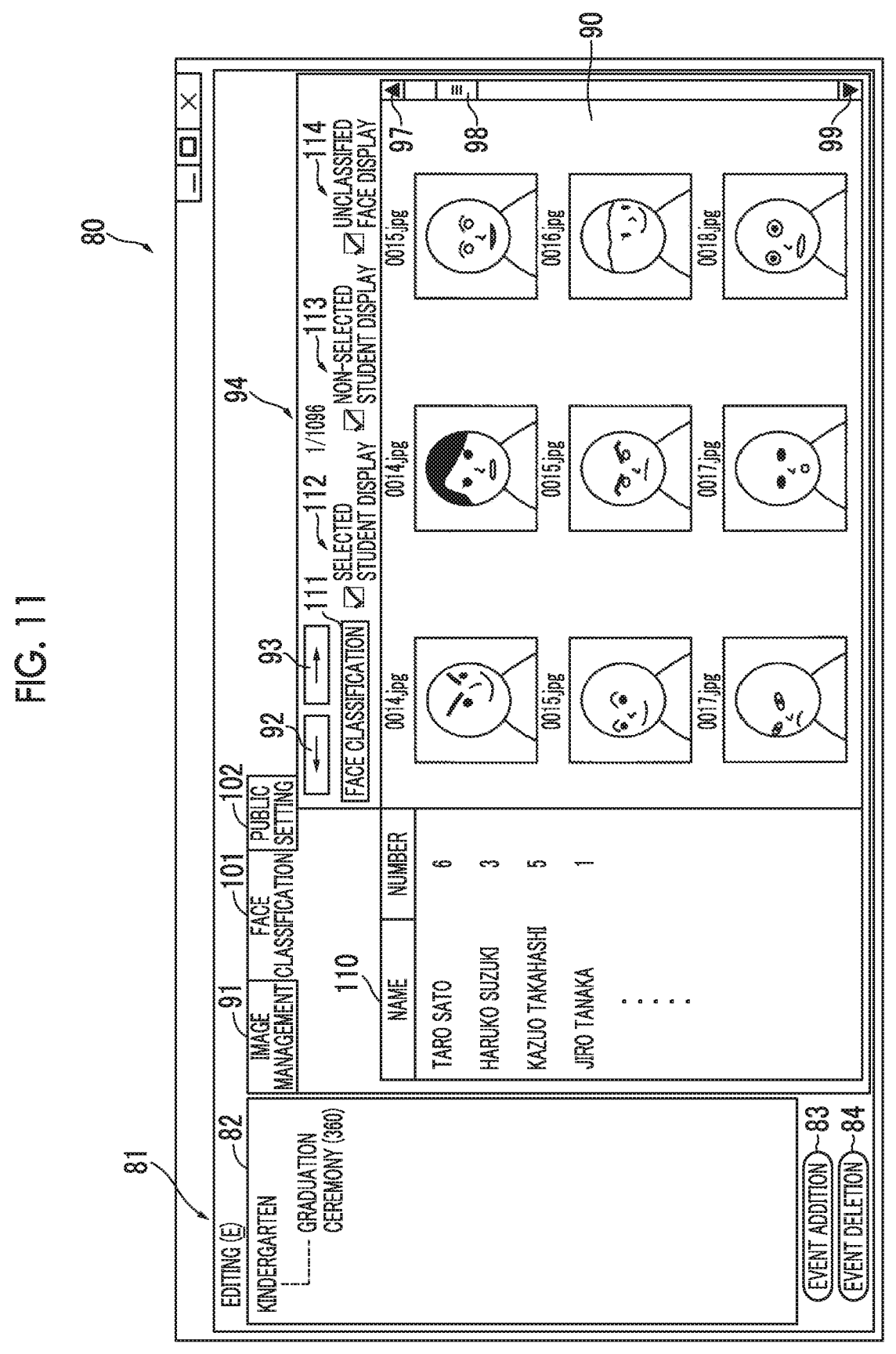
Figure 13:
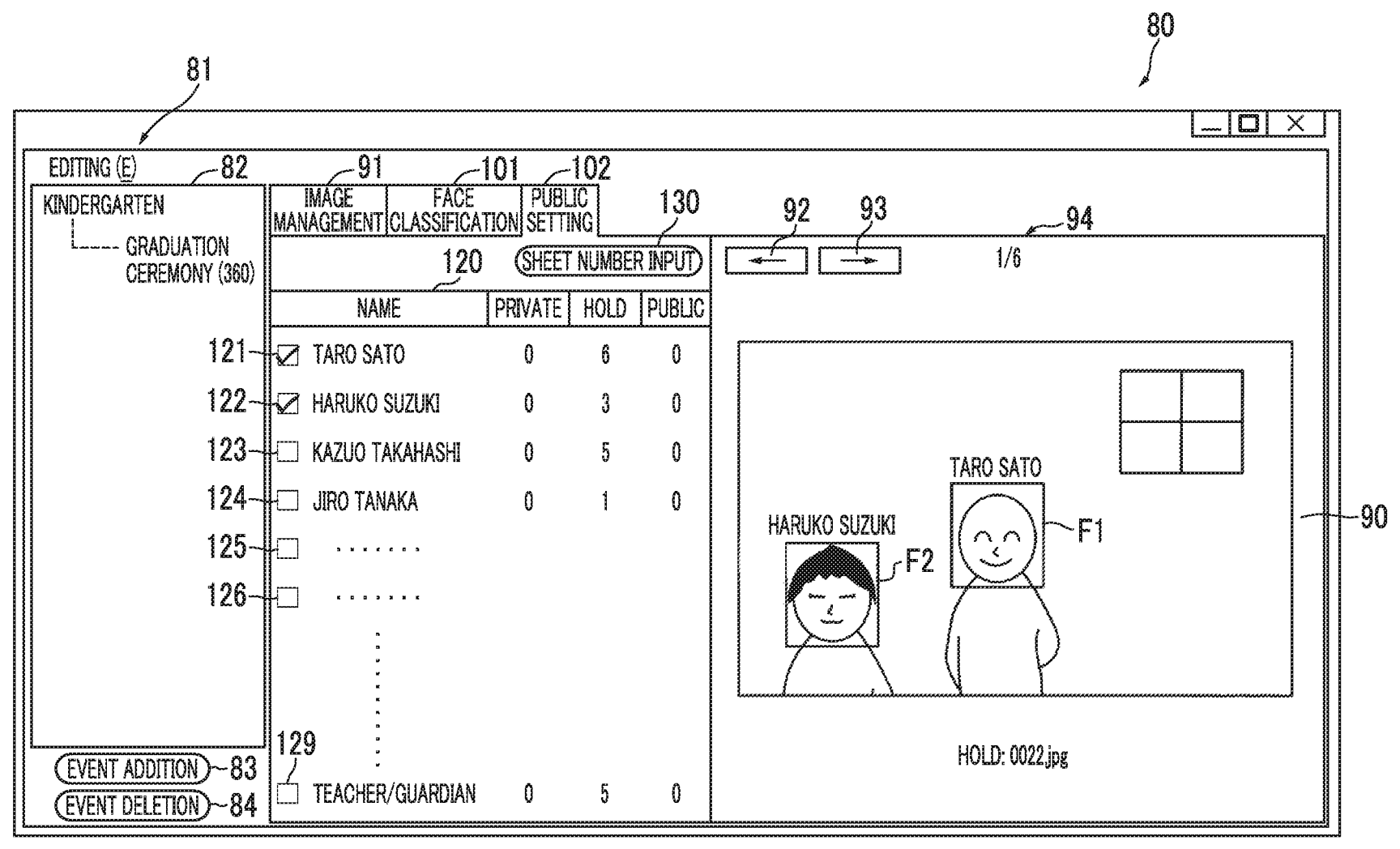

In a case where the face classification tab 101 is clicked by the user (YES in step S36 of FIG. 3), face image portions are displayed on the image display window 80 as a list, as shown in FIG. 11 (step S38 in FIG. 4). Further, in a case where the public setting tab 102 is clicked by the user (YES in step S37 of FIG. 3), the image display window 80 displays a public/private setting image for setting "public" or "private" of an image, as shown in FIG. 13 (step S49 of FIG. 5).

In a case where the face classification tab 101 is clicked by the user, an image display window 80 shown in FIG. 11 is displayed on the display screen of the display device 3. In FIG. 11, the same reference numerals are given to the same configurations as those shown in FIGS. 8 to 10, and description thereof will not be repeated.

In the image display area 90, face image portions extracted in the process of step S22 of FIG. 2 are displayed as a list. The face image portions are displayed in the image display area 90 in the order of file names of images including the face image portions, but the invention is not limited thereto.

A subject list area 110 is formed on a left side of the image display area 90. In the subject list area 110, names that are registered in advance in the image candidate determination apparatus 1 by the user as described above are displayed as a list. Further, the number of images in which a person with a name is shown is also displayed in correspondence with the name. The name displayed in the subject list area 110 may be selected (clicked) by the user.

Above the image display area 90, a face classification button 111 in which a "face classification" character string is displayed, a "selected student display" character string 112, a "non-selected student display" character string 113, and a "unclassified face display" character string 114 are displayed. Check boxes are respectively formed on left sides of the "selected student display" character string 112, the "non-selected student display" character string 113, and the "unclassified face display" character string 114.

In a case where the face classification button 111 is clicked, face image portions of the same person are collectively displayed (to be adjacent to each other) in the image display area 90. In a case where the check box on the left side of the "selected student display" character string 112 is checked, a face image of a person with a selected name among the names displayed in the subject list area 110 is displayed in the image display area 90. For example, in a case where the check box on the left side of the "selected student display" character string 112 is checked in a state where "Taro SATO" among the names displayed in the subject list area 110 is selected, a face image of "Taro SATO" is displayed in the image display area 90.

In a case where the check box on the left side of the "non-selected student display" character string 113 is checked, face images other than the selected name among the names displayed in the subject list area 110 are displayed in the image display area 90. For example, in a case where the check box on the left side of the "non-selected student display" character string 113 is checked in a state where "Taro SATO" among the names displayed in the subject list area 110 is selected, face images of persons other than "Taro SATO" are displayed in the image display area 90. In a case where the check box on the left side of the "unclassified face display" character string 114 is checked, face images of unclassified persons (whose names and face images are not associated by the user, as described above) are displayed in the image display area 90.

In a case where the face classification tab 101 is clicked and the face image portions displayed in the image display area 90 are displayed, the user may associate faces with names. As information on a name is stored in association with position information on a face image portion in a header of an image file indicating an image including the face image portion, the face and the name are associated with each other. With respect to a face image portion that is not associated with a name among the face image portions displayed in the image display area 90, only a file name of an image including the face image portion is displayed. With respect to the face image portion associated with the name, a file name of an image including the face image portion and the name are displayed.

In a case where names are associated with the face image portions displayed in the image display area 90, any one name among the names displayed in the subject list area 110 is clicked by the user (YES in step S39 of FIG. 4), and a face image portion of the name is clicked by the user (YES in step S40 of FIG. 4). Then, name information is stored in a header of an image file including the face image portion together with position information on the face image portion, as described above. The name selected together with a file name of an image including the face image portion is displayed above the clicked face image portion (step S41 of FIG. 4).

Subsequently, a first image evaluation value with which a name is associated is calculated by the CPU 2 (step S42 of FIG. 4, the first image evaluation value corresponds to a person image evaluation value in the invention). The first image evaluation value is an evaluation value for a person with the associated name. In a case where two persons are included in a certain image, in the same image, the first image evaluation value for one person and the first image evaluation value for the other person are different from each other.

The first image evaluation value is calculated according to evaluation parameters such as the number of persons included in an image and the size of a face included in the image. Table 1 is an example of a person number score table based on the number of persons included in an image.

TABLE 1

| | Number of persons | | | | | | | |
|---|---|---|---|---|---|---|---|---|
| | One person | Two persons | Three persons | Four persons | Five persons | Six persons | Seven persons | Eight persons~ |
| Persons number score | 1 | 3 | 5 | 7 | 10 | 7 | 6 | 5 |

As the number of persons included in an image is not too small and not too large, it may be considered that the image is well-balanced and the persons included in the image are appropriately conspicuous and evaluation of the image for the persons is high. For this reason, the calculation is performed by the CPU 2 so that the person number score becomes large in a case where the number of persons included in an image is about 5 and the person number score becomes small in a case where the number of persons included in the image is small or large (first image evaluation value calculating means). However, as the number of persons included in the image becomes smaller, the person number score may be set to become higher, and as the number of persons included in the image becomes larger, the person number score may be set to become higher.

Table 2 is an example of a face size score table based on the size of a face included in an image. In Table 2, the size of the face represents the size of the face with respect to the image. For example, in a case where the size of the face is "1/15", it means that the size of the face is 1/15 of the size of the image. In a case where a face is surrounded by a rectangular frame, the size may be determined using a horizontal pixel count of an image and a horizontal pixel count of a face image portion, using a vertical pixel count of the image and a vertical pixel count of the face image portion, or using the number of pixels in an entire image area and the number of pixels in a face area.

TABLE 2

| | Face size | | | | | | | |
|---|---|---|---|---|---|---|---|---|
| | ~1/15 | 1/12 | 1/10 | 1/8 | 1/6 | 1/5 | 1/4 | 1/3~ |
| Face size score | 1 | 3 | 5 | 7 | 10 | 7 | 5 | 2 |

Since the balance of an image is not good either in a case where the size of the face of a person included in the image is too large or in a case where the size of the face of the person included in the image is too small, the face size score is the highest at an appropriate ratio (here, 1/6), and the face size score is set to become lower as a distance therefrom becomes large.

With respect to the evaluation parameters, an expression score calculated by the number of persons included in an image and the size of a face included in the image, and additionally, the degree of focus of a face image portion included in the image, the degree of eye opening in the face included in the image, a facial expression of the face included in the image, and the like may be used, so that the face score may be calculated. A facial expression score is set corresponding to the evaluation parameters so that the facial expression score is higher as the image portion of the face is in better focus, the facial expression score is higher as the eyes are more properly opened, and the facial expression score is higher as the facial expression is more smiling.

In this embodiment, a raw score of the first image evaluation value is calculated on the basis of the sum of the person number score, the face size score, and the facial expression score.

In addition, an image quality score may be defined so that the score becomes higher as the image quality of one entire image becomes better (for example, as the focus becomes better), and may be used to calculate the raw score.

Further, in this embodiment, the first image evaluation value is corrected according to the number of images in which a specific person is shown. For this purpose, weighting is performed so that the first image evaluation value for the person becomes higher as the number of images that include a specific person becomes larger and the first image evaluation value for the person becomes lower as the number of the images that include the specific person becomes smaller.

Table 3 is an example of a weighting table. In Table 3, a maximum value represents a maximum value of images in which the same person is shown among images to be made public, and is "6", for example.

TABLE 3

| | Number of sheets | | | | | | |
|---|---|---|---|---|---|---|---|
| | 1 | Maximum value × 1/6 | Maximum value × 2/6 | Maximum value × 3/6 | Maximum value × 4/6 | Maximum value × 5/6 | Maximum value |
| Weighting coefficient | ×20 | ×18 | ×15 | ×10 | ×5 | ×3 | ×1 |

It is assumed that the first image evaluation value for each person is calculated for each image.

Table 4 shows a first image evaluation value for each image of "Taro SATO".

TABLE 4

| | Evaluation parameter | | | | | | | |
|---|---|---|---|---|---|---|---|---|
| Image filename | Focus | Face size | Eye opening | Facial expression | Number of persons | Score | Normalized to total 100 points | Weighting depending on the number of sheets (first image evaluation value) |
| 0022.jpg | 10 | 8 | 8 | 8 | 5 | 40 | 20 | 20 |
| 0019.jpg | 5 | 3 | 4 | 5 | 6 | 25 | 12.5 | 12.5 |
| 0021.jpg | 8 | 8 | 5 | 5 | 5 | 34 | 17 | 17 |
| 0013.jpg | 8 | 8 | 10 | 8 | 8 | 46 | 23 | 23 |

TABLE 4-continued

<table>
<tr><td colspan="8">Evaluationparameter</td></tr>
<tr><td>Image filename</td><td>Focus</td><td>Face size</td><td>Eye opening</td><td>Facial expression</td><td>Number of persons</td><td>Score</td><td>Normalized to total 100 points</td><td>Weighting depending on the number of sheets (first image evaluation value)</td></tr>
<tr><td>0020.jpg</td><td>4</td><td>5</td><td>5</td><td>3</td><td>4</td><td>26</td><td>13</td><td>13</td></tr>
<tr><td>0018.jpg</td><td>5</td><td>5</td><td>5</td><td>3</td><td>5</td><td>29</td><td>14.5</td><td>14.5</td></tr>
</table>

Table 4 shows a first image evaluation image obtained from "Taro SATO" for six images of image file names "0022.jpg", "0019.jpg", "0021.jpg", "0013.jpg", "0020.jpg", and "0018.jpg". Here, it is assumed that "Taro SATO" is shown in the six images. With respect to "Taro SATO", for example, a raw score of the first image evaluation value of the file name "0022.jpg" is "40", and raw scores of the other first image evaluation values are also shown. Scores obtained by normalizing these raw scores and weighting the normalized raw scores are respective first image evaluation values for "Taro SATO". Since "Taro Sato" appears in six images (the same number of images as the maximum value defined in the weighting table), a weighting coefficient is "×1" of the maximum value, and a first image evaluation value after correction based on the weighting coefficient becomes equal to the normalized raw score. In a case where the weighting coefficient is "×1", the first image evaluation value after correction based on the weighting coefficient and the normalized raw score become different from each other. As described above, it is preferable to correct the first image evaluation value by the CPU 2 (correction means) using a weighting coefficient (correction coefficient) for setting the first image evaluation value to is larger as the number of images in which the same person is included is smaller and setting the first image evaluation value to become smaller as the number of images in which the same person is included is larger.

With respect to a person with another name, in addition to "Taro SATO", similarly, an image evaluation value for the person is calculated for each image.

Table 5 shows, for six images in which "Taro SATO" is included, first image evaluation values for persons included in the six images, and shows a second image evaluation value that is a total image evaluation value for one image (the second image evaluation value corresponds to a total image evaluation value of the invention).

SUZUKI" in addition to "Taro SATO", the image of the image file name "0013.jpg" includes "Hanako ITO" in addition to "Taro SATO", the image of the image file name "0020.jpg" includes "Haruko SUZUKI", "Hanako ITO", "Jiro TANAKA", and "Ichiro WATANABE" in addition to "Taro SATO", and the image of the image file name "0018.jpg" includes "Ichiro WATANABE" in addition to "Taro SATO".

For example, the first image evaluation value of the image of the image file name "0022.jpg" is "20" for "Taro SATO", but is "200" for "Haruko SUZUKI", and the second image evaluation value that is the total image evaluation value of the image of the image file name "0022.jpg" is "220" that is the sum of "20" that is the first image evaluation value for "Taro SATO" and "200" that is the first image evaluation value for "Haruko SUZUKI". Similarly, with respect to the other images, it can be understood that the second image evaluation value of the image of the image file name "0019.jpg" is "62.5", the second image evaluation value of the image of the image file name "0021.jpg" is "367", the second image evaluation value of the image of the image file name "0013.jpg" is "63", the second image evaluation value of the image with the image file name "0020.jpg" is "1023", and the second image evaluation value of the image of the image file name "0018.jpg" is "414.5". Accordingly, among the six images, the image of the image file name "0020.jpg" having the highest second image evaluation value has the highest importance as the image, and the image of the image file name "0019.jpg" having the lowest second image evaluation value has the lowest importance as the image. In this way, it is preferable to add up the first image evaluation values that are different for each person included in the image for each image, and calculating the sum obtained by the addition by the CPU 2 (second image evaluation value calculating means) to set the sum as the second image evaluation value.

TABLE 5

<table>
<tr><td rowspan="2">Image file name</td><td colspan="5">Name</td><td rowspan="2">Sum (second image evaluation value)</td></tr>
<tr><td>Taro SATO</td><td>Haruko SUZUKI</td><td>Hanako ITO</td><td>Jiro TANAKA</td><td>Ichiro WATANABE</td></tr>
<tr><td>0022.jpg</td><td>20</td><td>200</td><td></td><td></td><td></td><td>220</td></tr>
<tr><td>0019.jpg</td><td>12.5</td><td></td><td>50</td><td></td><td></td><td>62.5</td></tr>
<tr><td>0021.jpg</td><td>17</td><td>150</td><td></td><td>200</td><td></td><td>367</td></tr>
<tr><td>0013.jpg</td><td>23</td><td></td><td>40</td><td></td><td></td><td>63</td></tr>
<tr><td>0020.jpg</td><td>13</td><td>200</td><td>60</td><td>150</td><td>600</td><td>1023</td></tr>
<tr><td>0018.jpg</td><td>14.5</td><td></td><td></td><td></td><td>400</td><td>414.5</td></tr>
</table>

It can be understood that the image of the image file name "0022.jpg" includes "Hanako SUZUKI" in addition to "Taro SATO", the image of the image file name "0019.jpg" includes "Haruko ITO" in addition to "Taro SATO", the image of the image file name "0021.jpg" includes "Haruko The second image evaluation value may be calculated by any calculation method in which the second image evaluation value is larger as the first image evaluation value is larger on the basis of the first image evaluation value that is calculated for each person who appears in an image, and may be calculated by the sum of the first image evaluation values after weighting. For example, with respect to image groups in events in which entire children participate, taking into account the number of opportunities for future imaging, large weights may be given to the first image evaluation values for children at higher grades (accordingly, small weights may be given for children at lower grades), and thus, the second image evaluation value may be calculated by the sum of the first image evaluation values.

In this embodiment, in a case where private images are determined from the six images, images having the low second image evaluation values are preferentially determined as private image candidates (non-extraction image candidates), and in a case where public images are determined therefrom, images with the high second image evaluation values are preferentially determined as public image candidates (extraction image candidates). In a case where an image is changed to be made public or private, the first image evaluation value and the second image evaluation value are calculated again.

In the above-described embodiment, in a case where an image includes a plurality of face image portions, the sum of evaluation values of the face image portions may be calculated, and the calculated sum may be used as a total image evaluation value. For example, referring to FIG. 5, it is assumed that the image of the image file name "0022.jpg" includes a face image portion with the name "Taro SATO" and an evaluation value of the face image portion is "20". Further, it is assumed that the image of the image file name "0022.jpg" includes a face image portion with the name "Haruko SUZUKI" and an evaluation value of the face image portion is "200". The sum of the evaluation values of the face image portions may be calculated, and the sum "220" of the obtained evaluation values may be used as the total image evaluation value.

In a case where an arrow button of the left arrow button 92 or the right arrow button 93 is clicked (YES in step S43 of FIG. 4), designation of an image is changed in accordance with the click of the left arrow button 92 or the right arrow button 93 (step S44 of FIG. 4). The numeral of the image specifying number 94 is also changed.

Figure 12:
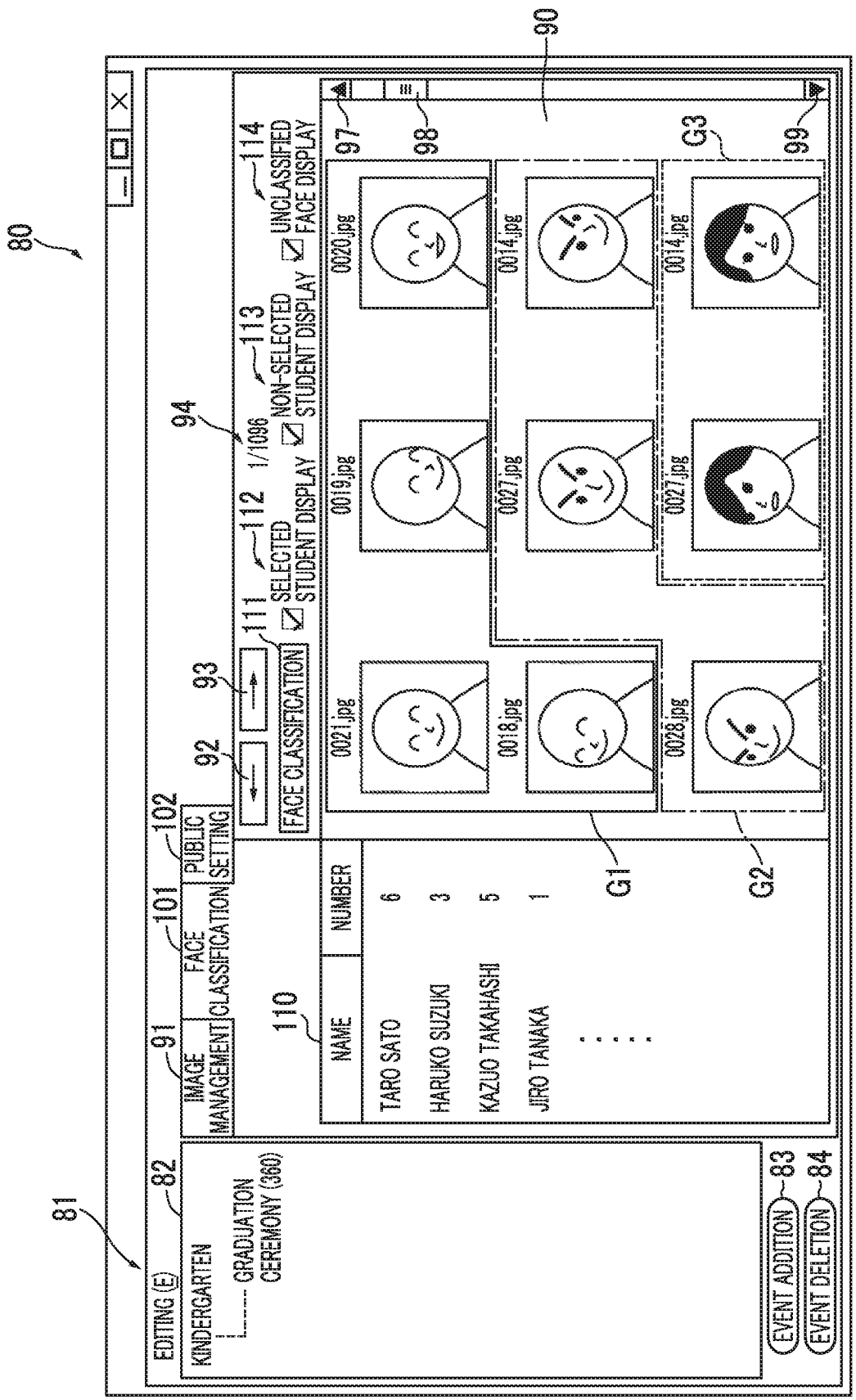
FIG. 12 is a diagram showing an example of an image display window.

In a case where the face classification button 111 is clicked (YES in step S45 of FIG. 4), the face image portions are classified and displayed for the same person as shown in FIG. 12 (step S46 of FIG. 4).

Referring to FIG. 12, a face image group G1 includes a face image portion included in the image with the image file name "0021.jpg", a face image portion included in the image with the image file name "0019.jpg", a face image portion included in the image with the image file name "0020.jpg", and a face image portion included in the image with the image file name "0018.jpg". The face image group G1 also includes a face image portion included in the image with the image file name "0022.jpg" and a face image portion included in the image with the image file name "0013.jpg", which are not shown in FIG. 12. The face image group G1 includes the face image portions of "Taro SATO".

Further, a face image group G2 includes a face image portion included in an image with an image file name "0027.jpg", a face image portion included in the image with the image file name "0014.jpg", and a face image portion included in an image with an image file name "0028.jpg". The face image portions included in the face image group G2 also represent the same person. Similarly, a face image group G3 includes a face image portion included in the image with the image file name "0027.jpg" and a face image portion included in the image with the image file name "0014.jpg". The face image portions included in the face image group G3 also represent the same person.

Similar to the image display window 80 in the state shown in FIG. 11, on the image display window 80 in the state shown in FIG. 12, in a case where a name displayed in the subject list area 110 is clicked (YES in step S39 of FIG. 4) and then a face image portion is clicked (step S40 of FIG. 4), the clicked face image portion and the name are associated with each other (step S41 of FIG. 4). Further, in a case where the face image group is classified as shown in FIG. 12, after the name displayed in the subject list area 110 is clicked (YES in step S39 of FIG. 4), as a face image portion included in a certain face image group or an area that is within an area of the certain face image group and is different from the face image portion is clicked, all the face image portions included in the face image group including the clicked portion and names may be associated with each other. The association of all the face image portions included in the face image group with the names may be relatively easily performed.

Further, in a case where the image management tab 91 is clicked (YES in step S47 of FIG. 4), the process proceeds to the process shown in FIG. 3. In addition, in a case where the public setting tab 102 is clicked (YES in step S48 of FIG. 4), a public/private setting image as shown in FIG. 13 is displayed on the image display window 80 (step S49 of FIG. 5).

In FIG. 13, the same reference numerals are given to the same configurations as those shown in FIGS. 8 to 12, and description thereof will not be repeated.

An image specified by the image specifying number 94 before the public setting tab 102 is clicked is displayed in the image display area 90. In FIG. 13, it is assumed that the image with the image file name "0022.jpg" is specified by the image specifying number. The image with the image file name "0022.jpg" is displayed in the image display area 90. The image with the image file name "0022.jpg" includes "Taro SATO" and "Haruko SUZUKI". The face of "Taro SATO" is surrounded by a face frame F1, and the name of "Taro SATO" is displayed above the face frame F1. The face of "Haruko SUZUKI" is surrounded by a face frame F2, and the name of "Haruko SUZUKI" is displayed above the face frame F2.

The public/private information display area 120 is formed on a left side of the image display area 90. Names of subjects are displayed in the public/private information display area 120. Check boxes 121 to 126, and 129 are formed on left sides of the names of the subjects, for example. "Teacher/guardian" is displayed on a right side of the check box 129 as a person name. This is because, in the case of a kindergarten graduation ceremony, since students are leading characters and teachers or guardians are supporting characters, the teachers or guardians are treated as the same person without distinction of persons. As described above, adults such as teachers and guardians may be regarded as the same person, and may be grouped for each image by the CPU 2 (image grouping means). The teachers and guardians may be separately treated for each person instead of being regarded as the same person. Check boxes of names corresponding to the persons (persons with the names) included in the image displayed in the image display area 90 are checked. In the example shown in FIG. 13, the image displayed in the image display area 90 includes "Taro SATO" and "Haruko SUZUKI". The check box 121 on the right side of the name "Taro SATO" and the check box 122 on the left side of the name "Haruko Suzuki" are checked.

Further, on the right sides of the names of the subjects, the number of sheets in a state of being set to "private" (the number of sheets of non-extraction images), the number of sheets in a state of being set to "hold", and the number of sheets in a state of being set to "public" (the number of sheets of extraction images), among images included in the subject, are displayed in the subject list area 110 of the image display window 80 displayed in the display device 3 (notification means) under the control of the CPU 2 (display control means) for each person. The display device 3 (notification means) can notify the number of the at least one extraction image and the number of the at least one non-extraction image, for each person included in the images.

Figure 5:
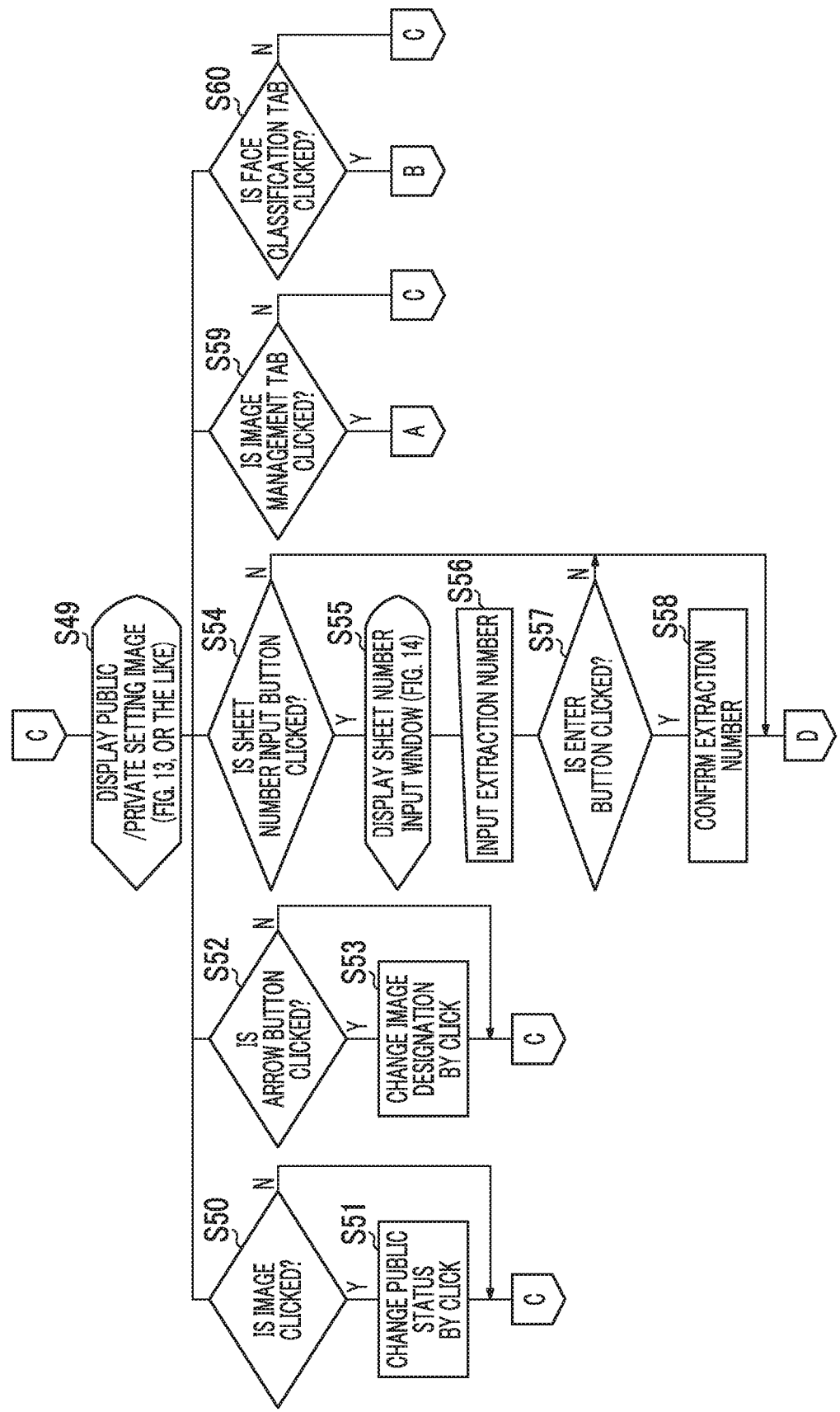
FIG. 5 is a flowchart showing a processing procedure of the image candidate determination apparatus.

In a case where the image displayed in the image display area 90 is clicked (YES in step S50 of FIG. 5), the public status of the clicked image in accordance with the click in a similar way to the process of step S27 of FIG. 3 is changed (step S51 of FIG. 5). In a case where the image is clicked once in a state where the public status of the image is "hold", the public status becomes "public". The number of sheets of "public" of each name of "Taro SATO" and "Haruko SUZUKI" in the public/private information display area 120 is changed from "0" to "1". Further, the number of sheets of "hold" of the name "Sato TARO" is changed from "6" to "5", and the number of sheets of "hold" of the name "Haruko SUZUKI" is changed from "3" to "2". In a case where the image is clicked again, the public status becomes "private". The number of sheets of "public" of each name of "Taro SATO" and "Haruko SUZUKI" in the public/private information display area 120 returns from "1" to "0", and the number of sheets of "private" of each name thereof is changed from "0" to "1".

In the case of two kinds of "private" and "public" without including "hold" in the public status, whenever the image included in the image display area 90 is clicked once, the public status is switched between "private" and "public", the number of images of "private" and the number of images of "public" that are displayed in the public/private information display area 120 are updated by the CPU 2 for each person included in the image, and are displayed (notified) in the public/private information display area 120 of the image display window 80 displayed in the display device 3 (notification means).

In a case where any arrow button of the left arrow button 92 or the right arrow button 93 is clicked (YES in step S52 of FIG. 5), the image specifying number 94 decreases or increases so that image designation is changed (step S53 of FIG. 5). In FIG. 13, one image among six images that include "Taro SATO" is displayed on the image display window 80, and the image specifying number 94 becomes "1/6". This is because the public setting tab 102 is clicked in a state where "Taro SATO" is selected in the subject list area 110 included in the image display window 80 shown in FIG. 12.

The image displayed in the image display area 90 includes "Taro SATO" and "Haruko SUZUKI". The face of "Taro SATO" is surrounded by the face frame F1, and the name "Taro Sato" is displayed above the face frame F1. Similarly, the face of "Haruko SUZUKI" is surrounded by the face frame F2, and the name "Haruko SUZUKI" is displayed above the face frame F2.

Figure 14:
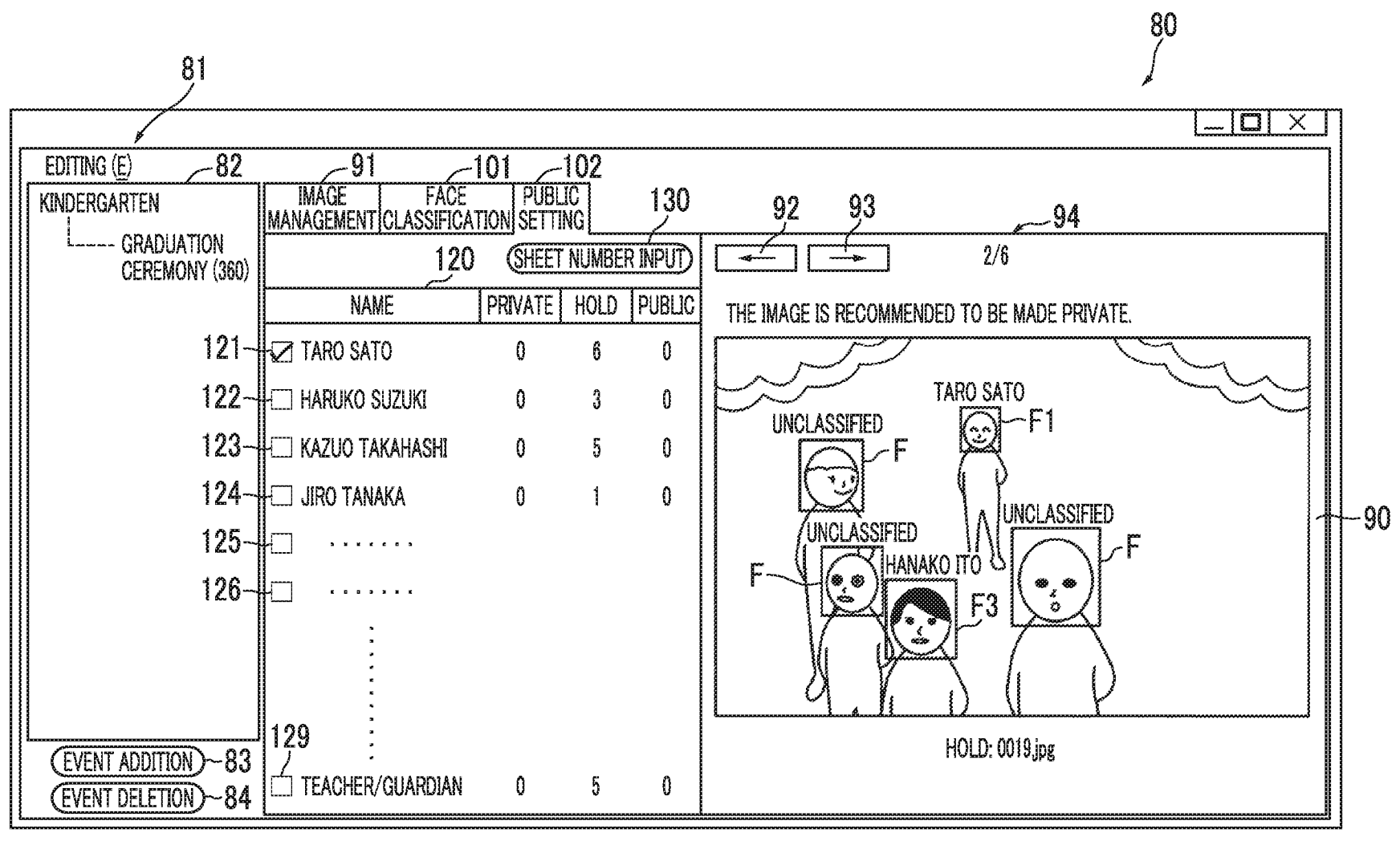

In a case where the right arrow button 93 is clicked in a state where the image display window 80 shown in FIG. 13 is displayed, the image display window 80 shown in FIG. 14 is displayed on the display screen of the display device 3.

Referring to FIG. 14, the image displayed in the image display area 90 includes persons whose names are not determined (face image portions are not associated with names using FIGS. 11, 12, and the like), in addition to names "Taro SATO" and "Hanako ITO". The face of "Taro SATO" is surrounded by the face frame F1, and the name "Taro Sato" is displayed above the face frame F1. Similarly, the face of "Hanako ITO" is surrounded by a face frame F3, and the name "Hanako ITO" is displayed above the face frame F3. Faces of unclassified persons whose names are not determined are surrounded by face frames F. A character string of "unclassified" is displayed above the unclassified face frame F so that it can be understood that the face image portion and the name are not associated with each other. Further, the image specifying number 94 is changed from "1/6" to "2/6" so that it can be understood that the second image among six images that include "Taro SATO" is displayed.

Figure 15:
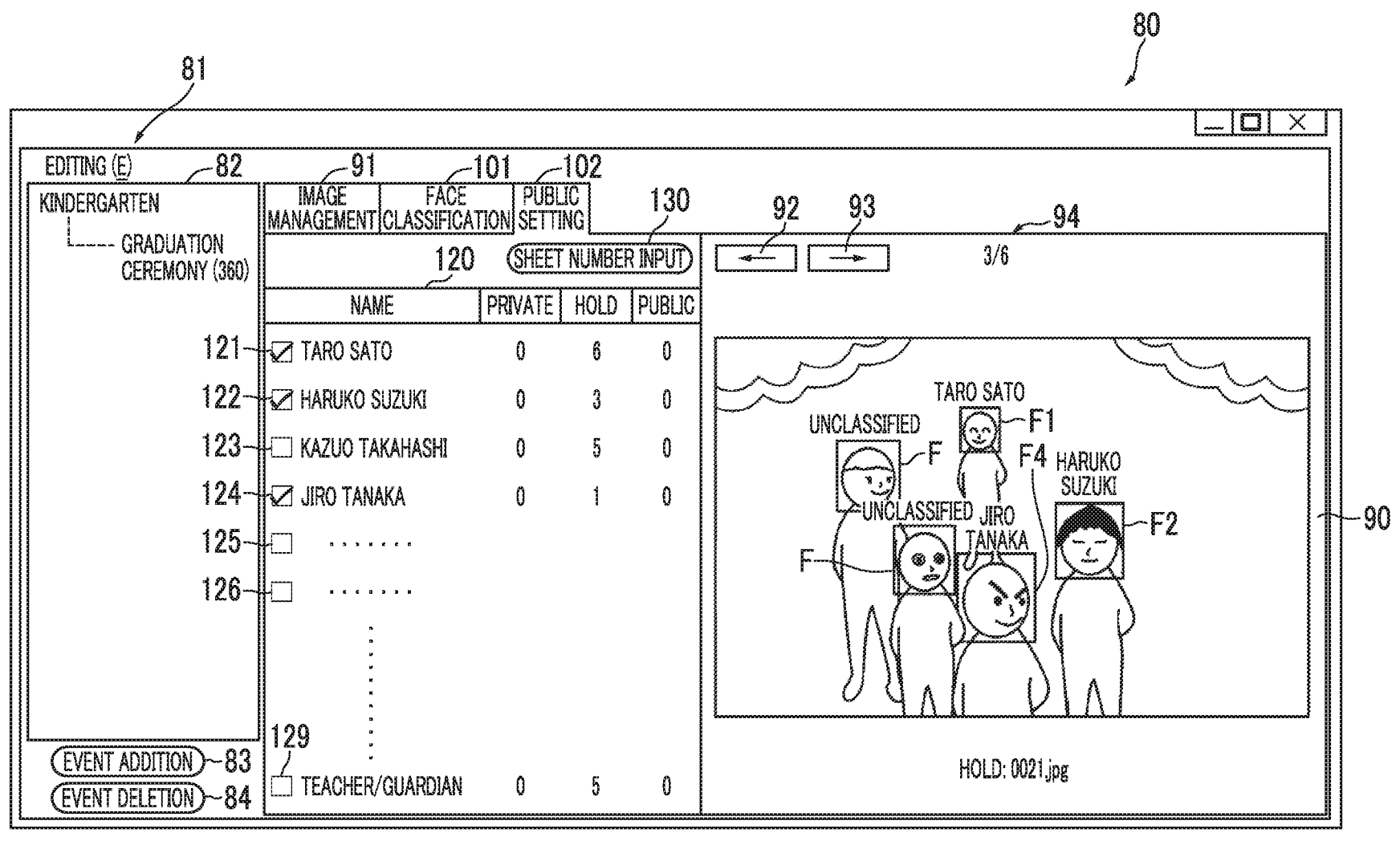

In a case where the right arrow button 93 is clicked in a state where the image display window 80 shown in FIG. 14 is displayed, the image display window 80 shown in FIG. 15 is displayed on the display screen of the display device 3.

Referring to FIG. 15, the image displayed in the image display area 90 includes persons whose names are not determined (face image portions and names are not associated with each other using FIGS. 11, 12, and the like), in addition to the names "Taro SATO" and "Hanako ITO". The face of "Taro SATO" is surrounded by the face frame F1, and the name "Taro Sato" is displayed above the face frame F1. Similarly, the face of "Haruko SUZUKI" is surrounded by the face frame F2, the name "Haruko SUZUKI" is displayed above the face frame F2, the face of "Jiro TANAKA" is surrounded by a face frame F4, and the name "Jiro TANAKA" is displayed above the face frame F4. Faces of unclassified persons whose names are not determined are surrounded by face frames F. The character string of "unclassified" is displayed above the unclassified face frames F. Further, the image specifying number 94 is changed from "2/6" to "3/6" so that it can be understood that the third image among six images that include "Taro SATO" is displayed.

Figure 16:
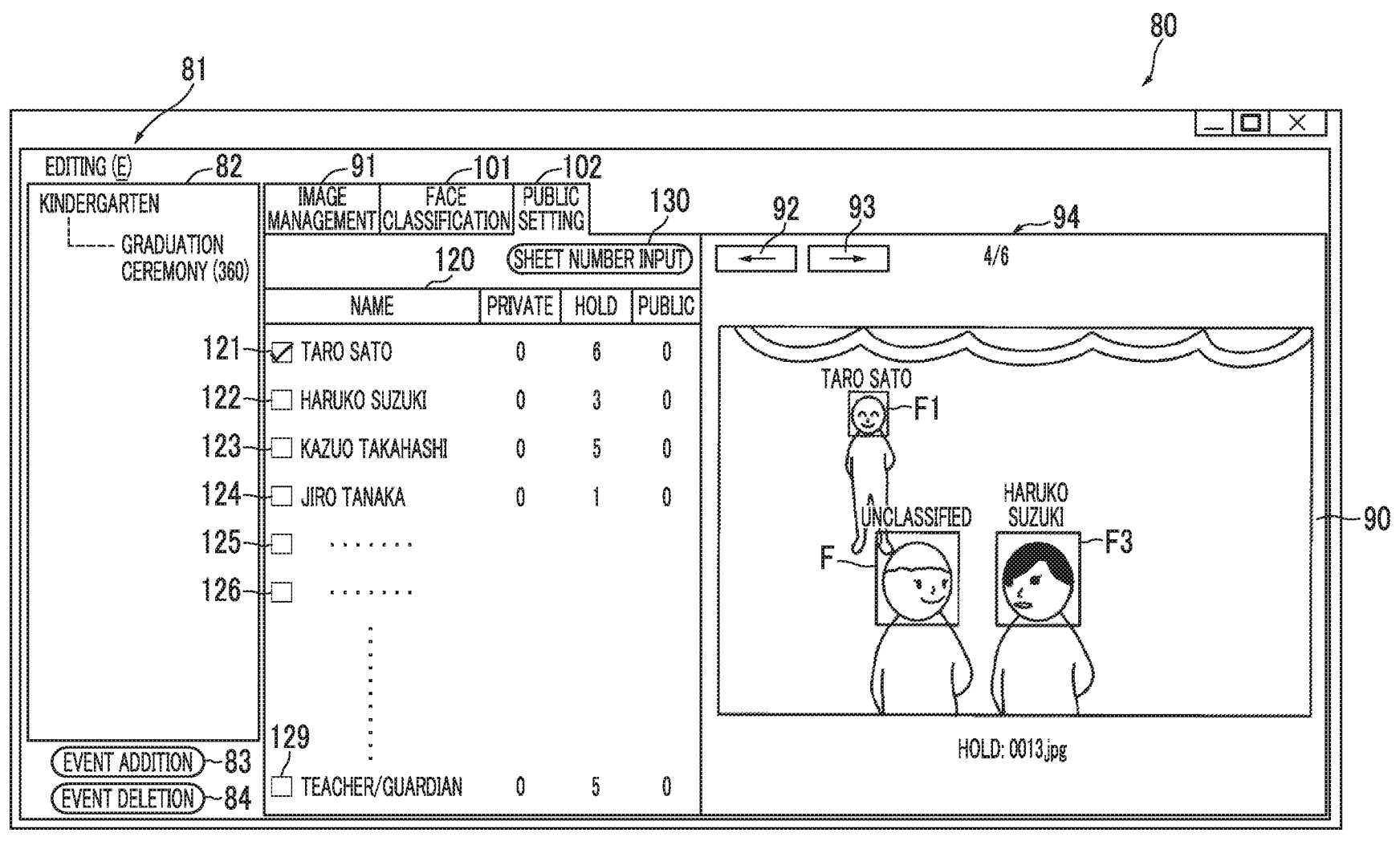

In a case where the right arrow button 93 is clicked in a state where the image display window 80 shown in FIG. 15 is displayed, the image display window 80 shown in FIG. 16 is displayed on the display screen of the display device 3.

Referring to FIG. 16, the image displayed in the image display area 90 includes persons whose names are not determined (face image portions and names are not associated with each other using FIGS. 11, 12, and the like), in addition to the names "Taro SATO" and "Hanako ITO". The face of "Taro SATO" is surrounded by the face frame F1, and the name "Taro Sato" is displayed above the face frame F1. Similarly, the face of "Hanako ITO" is surrounded by the face frame F3, and the face of an unclassified person whose name is not determined is surrounded by the face frame F. The character string of "unclassified" is displayed above the unclassified face frames F. Further, the image specifying number 94 is changed from "3/6" to "4/6" so that it can be understood that the fourth image among six images that include "Taro SATO" is displayed.

Figure 17:
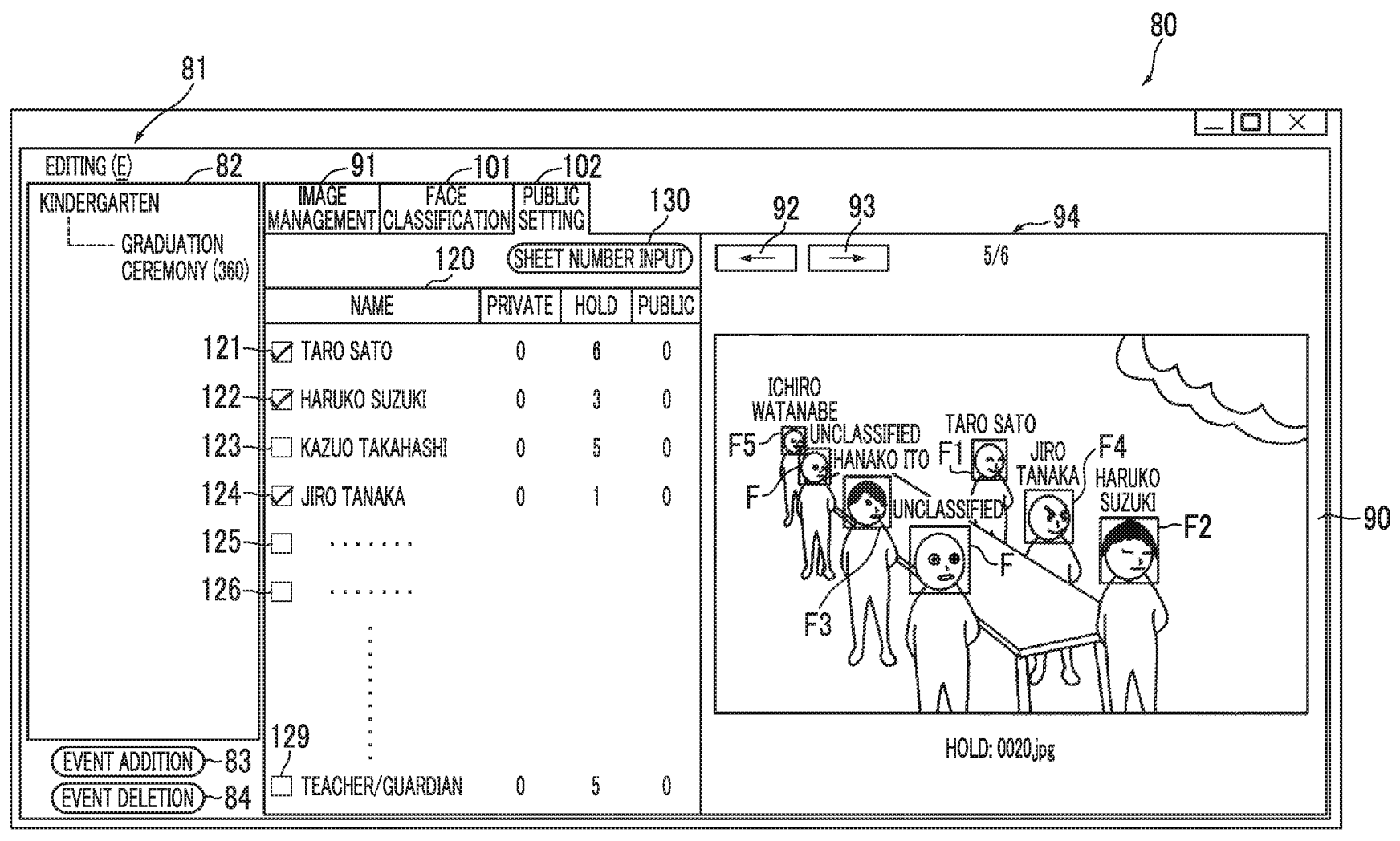

In a case where the right arrow button 93 is clicked in a state where the image display window 80 shown in FIG. 16 is displayed, the image display window 80 shown in FIG. 17 is displayed on the display screen of the display device 3.

Referring to FIG. 17, the image displayed in the image display area 90 includes persons whose names are not determined (face image portions and names are not associated with each other using FIGS. 11, 12, and the like), in addition to the names "Taro SATO", "Haruko SUZUKI", "Hanako ITO", "Jiro TANAKA", and "Ichiro WATANABE". The face of "Taro SATO" is surrounded by the face frame F1, and the name "Taro Sato" is displayed above the face frame F1. Similarly, the face of "Haruko SUZUKI" is surrounded by the face frame F2, the face of "Hanako ITO" is surrounded by the face frame F3, and the face of "Jiro TANAKA" is surrounded by the face frame F4, and the face of "Ichiro WATANABE" is surrounded by a face frame F5. Faces of unclassified persons whose names are not determined are surrounded by the face frame F, and a character string of "unclassified" is displayed above the unclassified face frame F. Further, the image specifying number 94 is changed from "4/6" to "5/6" so that it can be understood that the fifth image among six images that include "Taro SATO" is displayed.

Figure 18:
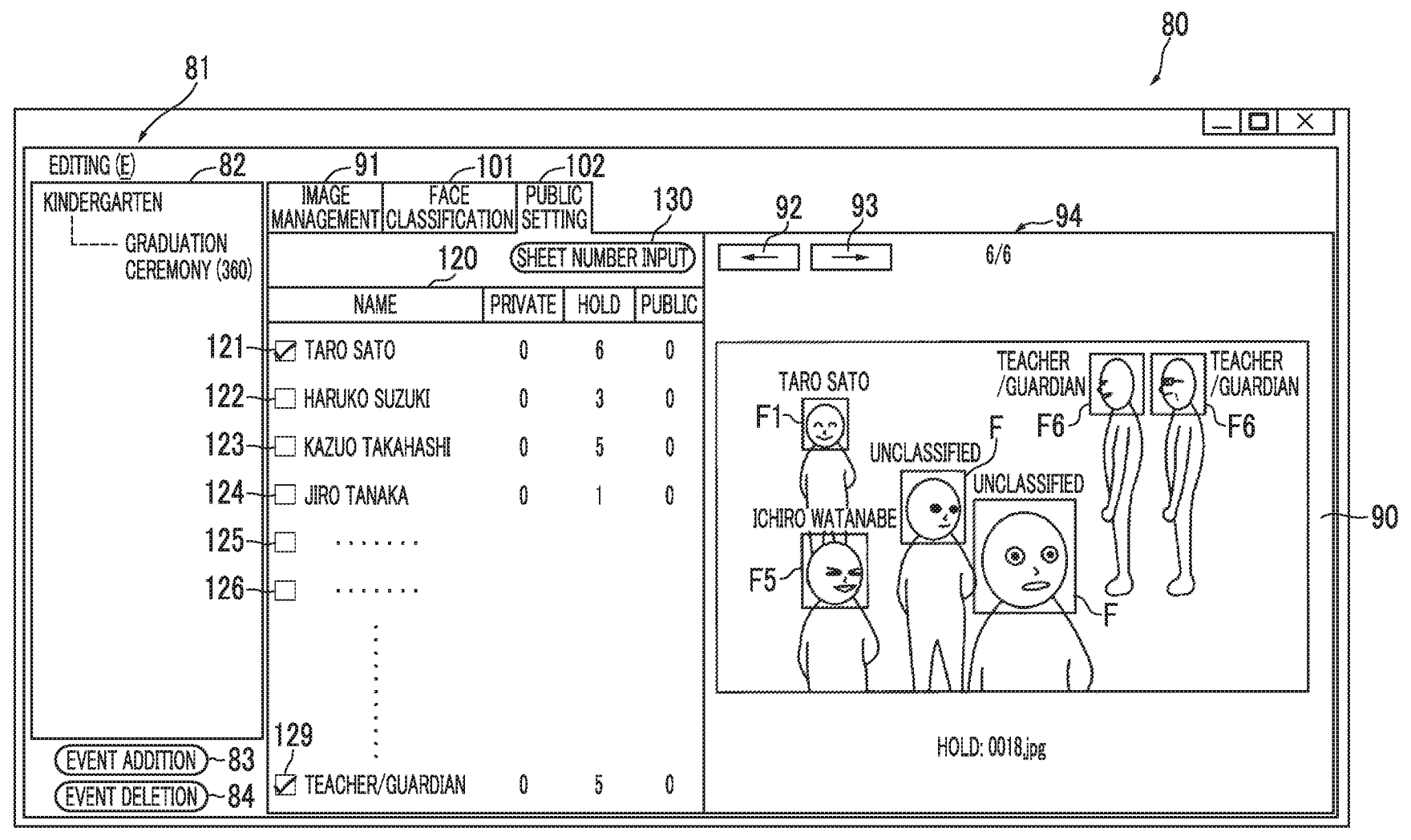

In a case where the right arrow button 93 is clicked in a state where the image display window 80 shown in FIG. 17 is displayed, the image display window 80 shown in FIG. 18 is displayed on the display screen of the display device 3.

Referring to FIG. 18, the image displayed in the image display area 90 includes "Taro SATO", "Ichiro WATANABE", and an adult or a guardian. Further, the image displayed in the image display area 90 also includes persons whose names are not determined (face image portions and names are not associated with each other using FIGS. 11, 12, and the like). The face of "Taro SATO" is surrounded by the face frame F1, and the name "Taro Sato" is displayed above the face frame F1. Similarly, the face of "Ichiro WATANABE" is surrounded by the face frame F5, and the face of the adult or guardian is surrounded by a face frame F6. Faces of unclassified persons whose names are not determined are surrounded by the face frame F, and a character string of "unclassified" is displayed above the unclassified face frame F. Further, the image specifying number 94 is changed from "5/6" to "6/6" so that it can be understood that the sixth image among six images that include "Taro SATO" is displayed.

In a case where the left arrow button 92 is clicked in a state where the image display window 80 shown in FIG. 18 is displayed, the image displayed before the right arrow button 93 is clicked is displayed in the image display area 90 of the image display window 80 whenever the left arrow button 92 is clicked.

As shown in FIGS. 13 to 18, whenever the right arrow button 93 or the left arrow button 92 is clicked, persons including the name "Taro SATO" may be sequentially displayed in the image display area 90. In any of the images displayed in the image display area 90 of the image display window 80 shown in FIGS. 13 to 18, whenever the image is clicked, the public status is changed in the order of "public", "private" or "hold", and the user may specify whether to make the image displayed in the image display area 90 public or private. With respect to an image that does not include a person including the name "Taro SATO", the user may similarly specify whether to make the image public or private.

For example, as shown in FIGS. 13 to 18, in a case where a name displayed in the subject list area 110 is clicked (selected) in a state where the public setting tab 102 is clicked, an image including a person with the clicked name is displayed in the image display area 90. For example, in a case where "Haruko SUZUKI" among the names displayed in the subject list area 110 is clicked, one image among the images including "Haruko SUZUKI" is displayed in the image display area 90. Since the number of the images including "Haruko SUZUKI" (images in which the name of "Haruko SUZUKI" and the images are associated with each other) is three (this is because the sum of the number of private images, the number of hold images, and the number of public images displayed corresponding to the name of "Haruko SUZUKI" in the subject list area 110 is three), in a case where the right arrow button 93 is clicked in a state where the image of "Haruko SUZUKI" is displayed in the image display area 90, the three images are sequentially displayed in the image display area 90.

Figure 19:
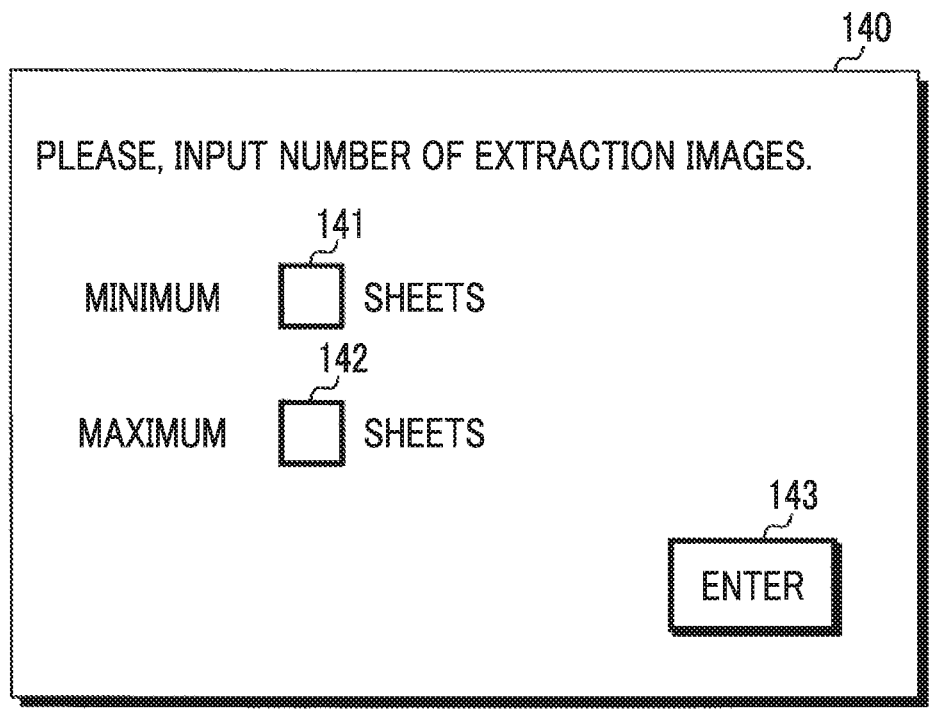
FIG. 19 is a diagram showing an example of an extraction number input window.

In a case where a sheet number input button 130 is clicked (YES in step S54 of FIG. 5), in a state where the image display window 80 is displayed (the image display window 80 may temporarily disappear), an extraction sheet number input window 140 shown in FIG. 19 is displayed on the display screen of the display device 3 (step S55 in FIG. 5).

Referring to FIG. 19, the extraction sheet number input window 140 is a window in which a minimum number and a maximum number of images to be disclosed in images including the same person are input (the minimum number and the maximum number of the images to be disclosed are limit values of an extraction number of images). A character string of "Please, input extraction number." is displayed on the extraction sheet number input window 140, and a minimum sheet number input area 141 and a maximum sheet number input area 142 are formed. By clicking the minimum sheet number input area 141, the minimum number to be disclosed for images including the same person may be input in the minimum sheet number input area 141 through the keyboard 8, and by clicking the maximum sheet number input area 142, the maximum number of images to be disclosed for images including the same person may be input in the maximum sheet number input area 142 through the keyboard 8. On a lower right side of the extraction sheet number input window 140, an enter button 143 in which a character string of "determination" is displayed is formed.

In a case where the minimum number is input in the minimum sheet number input area 141 and the maximum number is input in the maximum sheet number input area 142 (either the minimum number or the maximum number may be input) (step S56 of FIG. 5), and then, the enter button 143 is clicked (YES in step S57 of FIG. 5), an input extraction number (a minimum extraction number and a maximum extraction number) is stored in the memory 7 (step S58 of FIG. 5). The extraction sheet number input window 140 disappears from the display screen of the display device 3.

Figure 6:
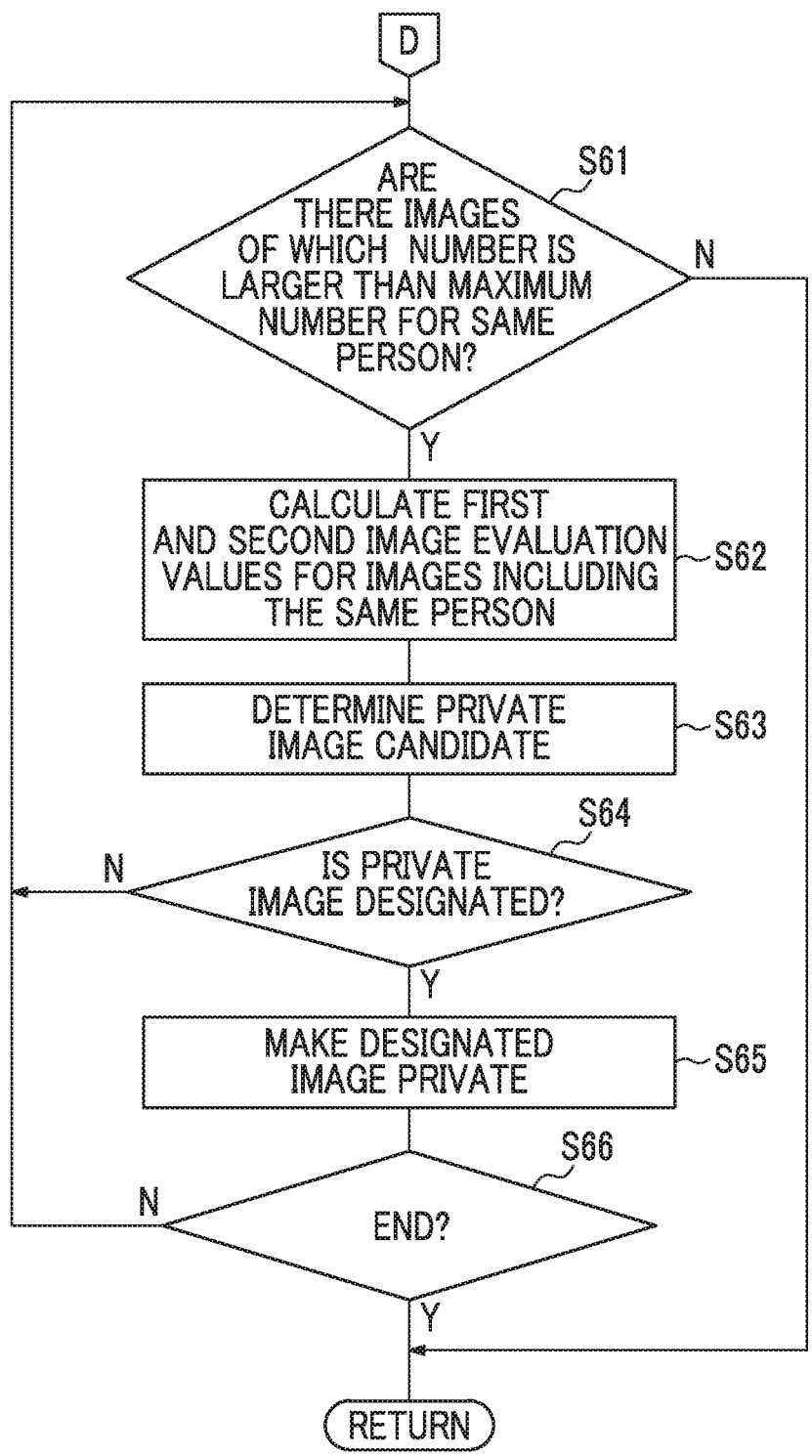
FIG. 6 is a flowchart showing a processing procedure of the image candidate determination apparatus.

The CPU 2 confirms whether or not there are images that include the same person, in which the number of images that are made public is greater than the input maximum number (step S61 of FIG. 6). In a case where there are images of which the number is greater than the input maximum number (YES in step S61 of FIG. 6), the first image evaluation value and the second image evaluation value for the images including the same person are calculated by the CPU 2 (step S62 of FIG. 6), and a private image candidate is determined by the CPU 2 (image candidate determination means) from among the images that are made public to be within the maximum number of images (within the limit value) including the same person (step S63 of FIG. 6).

For example, it is assumed that images including "Taro SATO" are six images including file names "0022.jpg", "0019.jpg", "0021.jpg", "0013.jpg", "0020.jpg", and "0018.jpg". Then, the six second image evaluation values become values shown in Table 5, for example. Further, it is assumed that the input maximum number is 5. Then, one of the six images is determined as a private image candidate by the CPU 2. As can be understood from Table 5, since an image with the lowest second image evaluation value among the second image evaluation values of the six images is an image having the image file name "0019.jpg", the image having the image file name "0019.jpg" is determined as a private image by the CPU 2 (image candidate determination means). In this way, a private image candidate (non-extraction image candidate) is determined from grouped images based on the second image evaluation value and the limit value of the extraction number of images including the same person. The CPU 2 (image candidate determination means) can determine an extraction image candidate and a non-extraction image candidate from the grouped images, on the basis of a total image evaluation value and a limit value of an extraction number of images in which the same person is included.

Conversely, five images among the six images in a descending order of the second image evaluation values may be determined as public image candidates (extraction image candidates) by the CPU 2 (image candidate determination means). For example, a window containing a character string of "It is recommended that the image with the image file name "0019.jpg" is made private" may be displayed on the display screen together with the image (non-extraction image candidate) having the image file name "0019.jpg" under the control of the CPU 2 (image candidate display control means). Conversely, the images (extraction image candidates) having the image file names other than the image file name "0019.jpg", among six images having the file names "0022.jpg", "0019.jpg", "0021.jpg", "0013.jpg", "0020.jpg", and "0018.jpg", may be displayed on the display screen together with a character string of "It is recommended that the images are made public" under the control of the CPU 2 (image candidate display control means). As the user clicks the left arrow button 92 or the right arrow button 93, the image display window 80 in which the image having the image file name "0019.jpg" is displayed in the image display area 90 as shown in FIG. 14 is displayed on the display screen of the display device 3.

In a case where the user confirms the image displayed in the image display area 90 and makes the image private, the user clicks the image to determine the public status to be private by the CPU 2 (image determination means). Thus, the private image is designated (YES in step S64 and step S65 of FIG. 6). In a case where an end command is not given (NO in step S66), the processes from step S61 are repeated.

In the above-described embodiment, the private image candidate is determined, but instead of determining the private image candidate, the public image candidate may be determined. For example, the images with the image file names "0022.jpg", "0021.jpg", "0013.jpg", "0020.jpg", and "0018.jpg" may be used as public image candidates. In a case where an image to be made public from public image candidates is determined, by clicking the image, the public status is determined to be public by the CPU 2 (image determination means).

Further, in determining a private image candidate or a public image candidate, in a case where an extraction number of images including a specific person exceeds the maximum number or is smaller than the minimum number as the determined private image candidate is set to be a private image or the determined public image candidate is set to be a public image (in a case where the extraction number of the images including the specific person is out of the limit value as the determined one non-extraction image candidate is set to be a non-extraction image or the determined one extraction image candidate is set to be an extraction image), it is preferable that such an image is excluded from the private image candidates (non-extraction image candidates) or the public image candidates (extraction image candidates) under the control of the CPU 2 (image candidate stopping means). For example, in Table 5, in a case where the image with the image file name "0019.jpg" is determined as a private image as described above, the number of public images of a specific person (for example, "Hanako ITO") is smaller than the minimum number, it is preferable that the image with the image file name "0019.jpg" is not determined as a private image candidate, and instead, another image is determined as a private image candidate, or it is preferable that the image with the image file name "0019.jpg" is determined as a public image candidate.

In a case where the end command of the program is not given to the image candidate determination apparatus 1 (NO in step S66 of FIG. 6), the processes from step S61 of FIG. 6 are repeated. In a case where there are still images that are public images, in which the number of images including the same person is larger than the maximum number (YES in step S61 of FIG. 6), an image evaluation value for such an image is calculated again (step S62 of FIG. 6).

In a case where there is no image that is made public, in which the number of images including the same person is larger than the maximum number (NO in step S61 of FIG. 6), the process is finished.

In the above-described embodiment, a state where an image group capable of being used as public images after an event is ended is settled is assumed. However, the above-described processes may be performed in real time during the event to image a person with a small number of images. In this case, in the process of step S61 of FIG. 6 (NO in step S61), in a case where there are no images of which the number of images including the same person is larger than the input maximum number, the process proceeds to the process of step S67 shown in FIG. 7.

Figure 7:
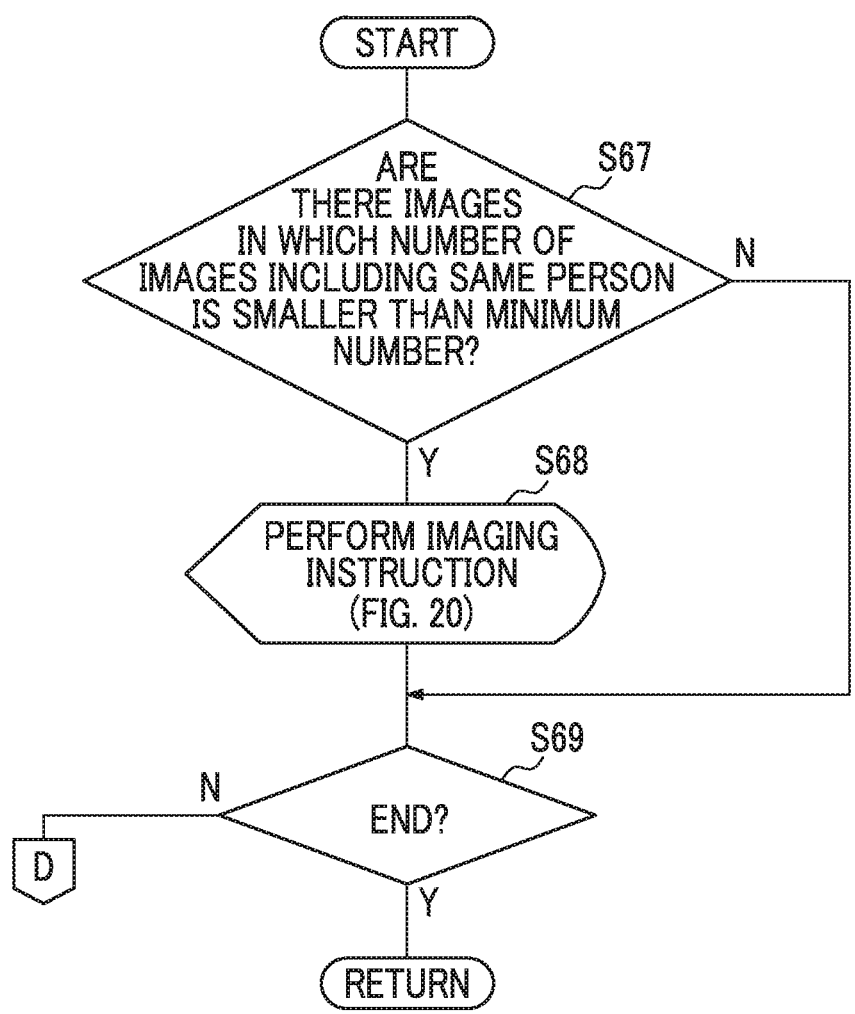
FIG. 7 is a flowchart showing a processing procedure of the image candidate determination apparatus.

In the process of step S67 shown in FIG. 7, it is confirmed whether or not there are images that are public images, in which the number of images including the same person is smaller than the minimum number (step S67 of FIG. 7). In a case where there are images in which the number of images including the same person is smaller than the minimum number (YES in step S67 of FIG. 7), an imaging instruction window 150 shown in FIG. 20 is displayed on the display screen of the display device 3 (step S68 of FIG. 7).

That is, such a person that the number of the same person included in one or more grouped images is equal to or smaller than a threshold value is detected by the CPU 2 (person detecting means), and an imaging instruction for the person is performed by the CPU 2 (imaging instruction means).

Figure 20:
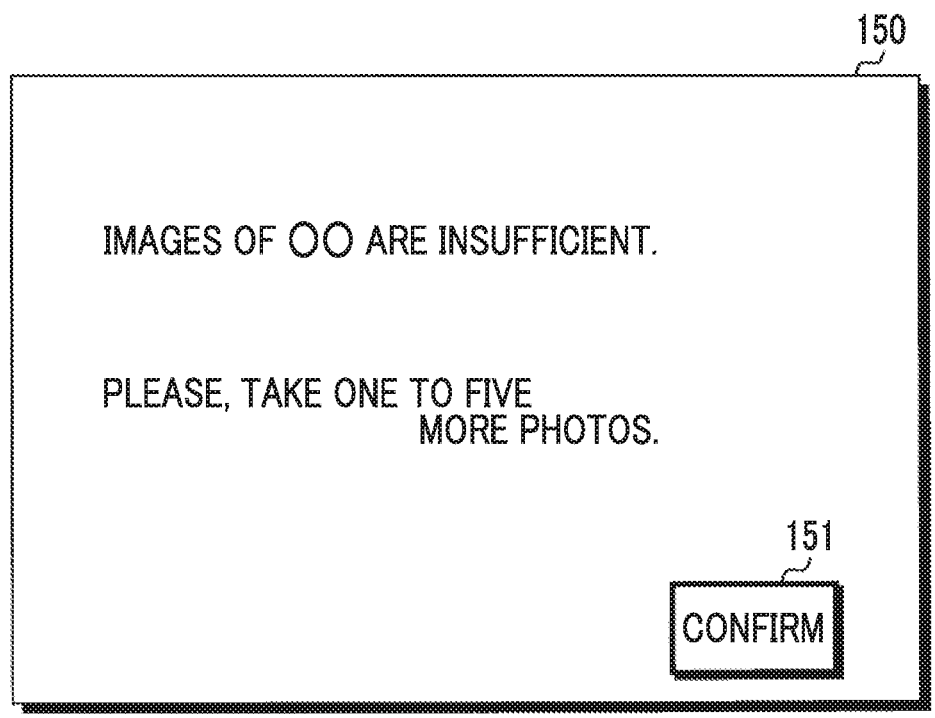
FIG. 20 is a diagram showing an example of an image instruction window.

Referring to FIG. 20, an imaging instruction window 150 prompts the user to image a person whose number of captured images is smaller than the minimum number.

In the imaging instruction window 150, a character string of "Images of OO are insufficient" (a name of a person whose number of images is insufficient is written in OO) to inform the user of the name of the person whose number of images is insufficient is displayed, and also, a character string of "Please take one to five more photos" to inform the user of the number of insufficient images (in which the number of insufficient images varies depending on situations, but it is preferable that the number of images after imaging is equal to or larger than the input minimum number and is equal to or smaller than the input maximum number) is displayed.

On a lower right side of the imaging instruction window 150, a confirm button 151 in which "confirm" is displayed is formed. In a case where the user confirms how many images are insufficient, the user clicks the confirm button 151. Then, the imaging instruction window 150 disappears from the display screen of the display device 3.

In a case where there are no images in which the number of images including the same person is smaller than the minimum number of imaging (NO in step S67 of FIG. 7), the display of the imaging instruction window 150 shown in FIG. 20 is skipped.

In a case where a program end command is given to the image candidate determination apparatus 1 (YES in step S69 of FIG. 7), the program ends (YES in step S69 of FIG. 7), and in a case where the program end command is not given (NO in step S69 of FIG. 7), the processes from step S61 in FIG. 6 are repeated. However, in a case where the end command is not given (NO in step S66 of FIG. 6 or NO in step S69 of FIG. 7), the process may return to step S49 of FIG. 5.

In a case where the public/private setting image is displayed (step S49 in FIG. 5), and in a case where the image management tab 91 is clicked (YES in step S59 of FIG. 5), the processes from step S25 in FIG. 3 are performed. Further, in a case where the public/private setting image is displayed (step S49 of FIG. 5), and in a case where the face classification tab 101 is clicked (YES in step S60 of FIG. 5), the processes from step S38 in FIG. 4 are performed.

In the above-described embodiment, in a case where the program end determination process in step S66 of FIG. 6 and the program end determination process in FIG. 7 are performed, the image candidate determination program ends, but in other processes, similarly, in a case where the end command is given to the image candidate determination apparatus 1, the image candidate determination program ends in accordance with interruption of the end command.

Further, in the above-described embodiment, a configuration in which image data representing a plurality of images stored in the memory card 13 is read by the memory card reader/writer 12 is shown, but a configuration in which image data representing a plurality of images is stored in a database server different from the image candidate determination apparatus 1 and the images represented by the image data transmitted from the database server through communication of the database server and the image candidate determination apparatus 1 are displayed on the display screen of the display device 3 of the image candidate determination apparatus 1 as described above may be used.

Further, in the above-described embodiment, a configuration in which image data recorded on the memory card 13 is read is shown, but a configuration in which in a case where the communication device 4 of the image candidate determination apparatus 1 is able to communicate with a digital camera (not shown) by wireless communication means, image data representing images captured using the digital camera are transmitted from the digital camera to the image candidate determination apparatus 1 to perform the above-described processes may be used. Similarly, a configuration in which image data representing images captured by a smartphone is transmitted from the smartphone to the communication device 4 of the image candidate determination apparatus 1 to perform the above-described processes may be used. A configuration in which image data representing images captured by a digital camera or a smartphone is transmitted to the image candidate determination apparatus 1 in real time to perform the above-described processes during imaging may be used. Further, a configuration in which the image data representing the images captured by the digital camera or the smartphone is transmitted to the image candidate determination apparatus 1 after all imaging ends may be used.

Further, in the above-described embodiment, a configuration in which in calculating a raw score of the first image evaluation value, an evaluation value related to the face such as a face size score or an expression score or an evaluation value related to a factor other than the face such as a person number score or an image quality score are used is shown, but a configuration in which only the evaluation value related to the face is used as the raw score of the first image evaluation value, or a configuration in which only the evaluation value related to the factor other than the face is used as the raw score of the first image evaluation value may be used.

Further, in the above-described embodiment, a configuration in which the user associates a face image portion with a name while the user views the face image portion is shown, but a configuration in which the user associates the face image with the name of the person of the face in advance, performs comparison with the face image associated with the name to automatically determine whose the face is, and associates the face image portion with the name may be used. In addition, in the above-described embodiment, a configuration in which name association is performed using a face image portion is shown, but a configuration in which in a case where a person has a name tag, the user confirms the name tag instead of the face image portion to associate the face image portion with the name, or a configuration in which the name written on the name tag is automatically analyzed to associate the face image portion with the name may be used.

FIGS. 21 to 26 show modification examples.

Figure 21:
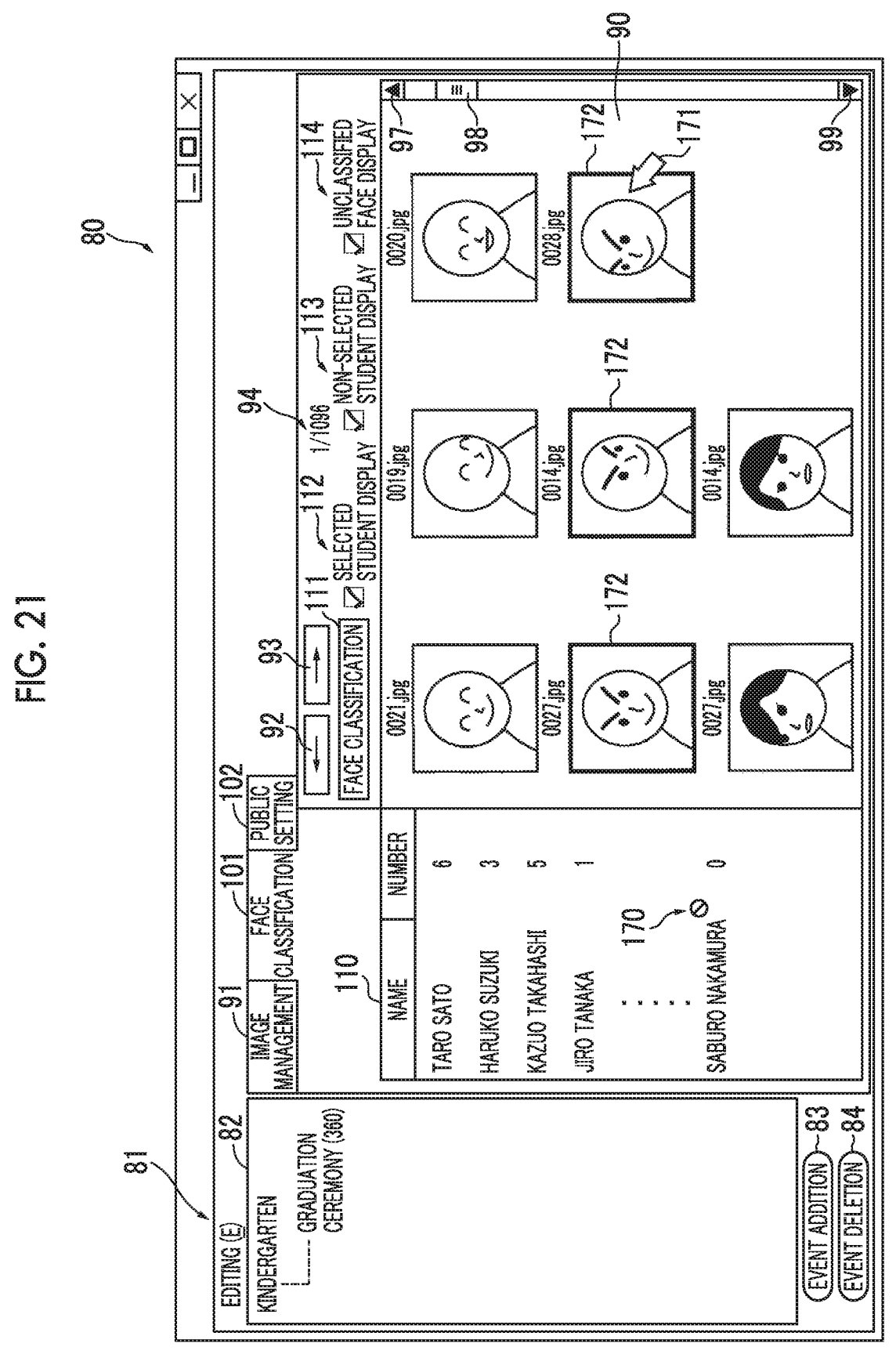
Figure 22:
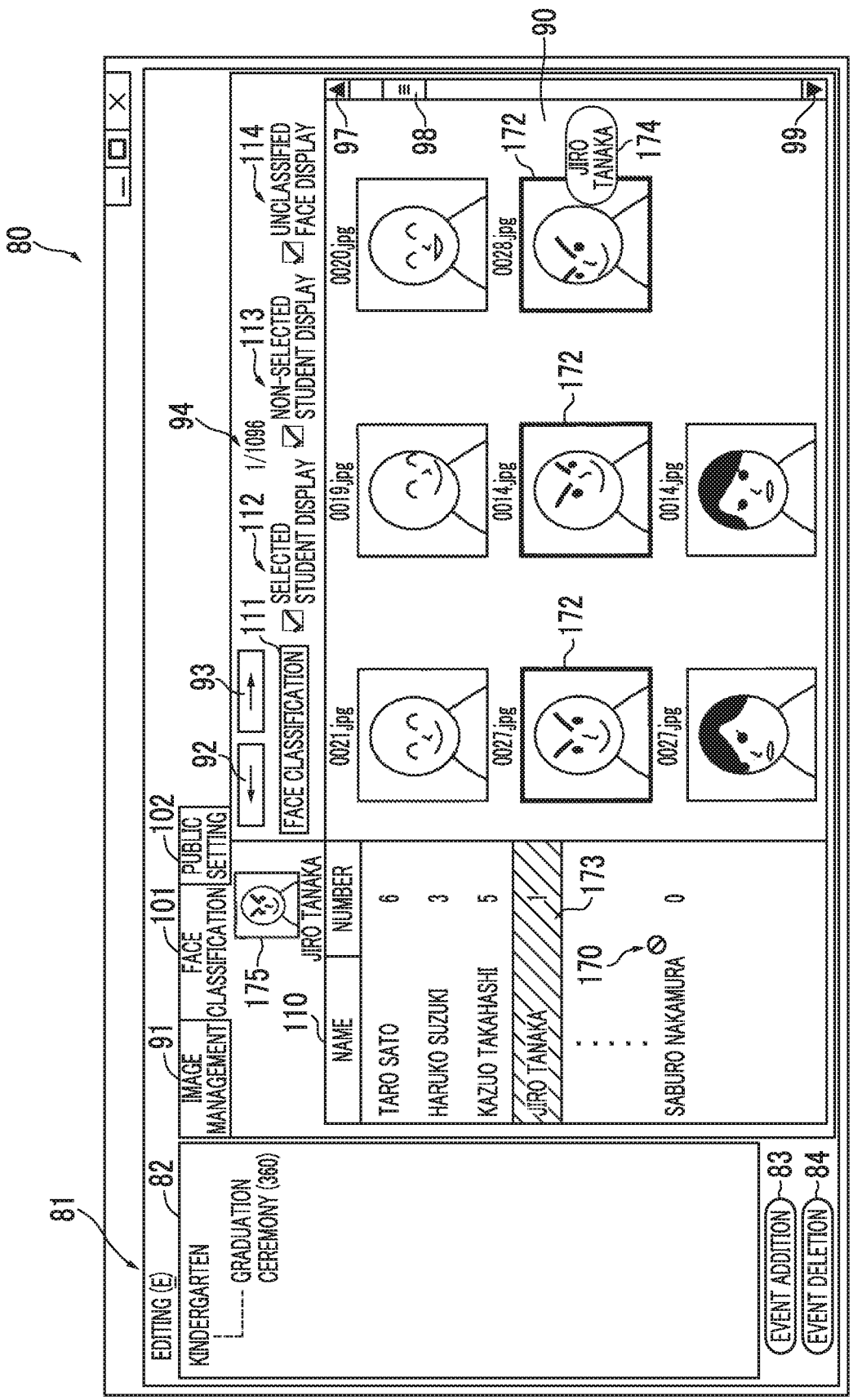
FIG. 22 is a diagram showing an example of an image display window.
Figure 23:
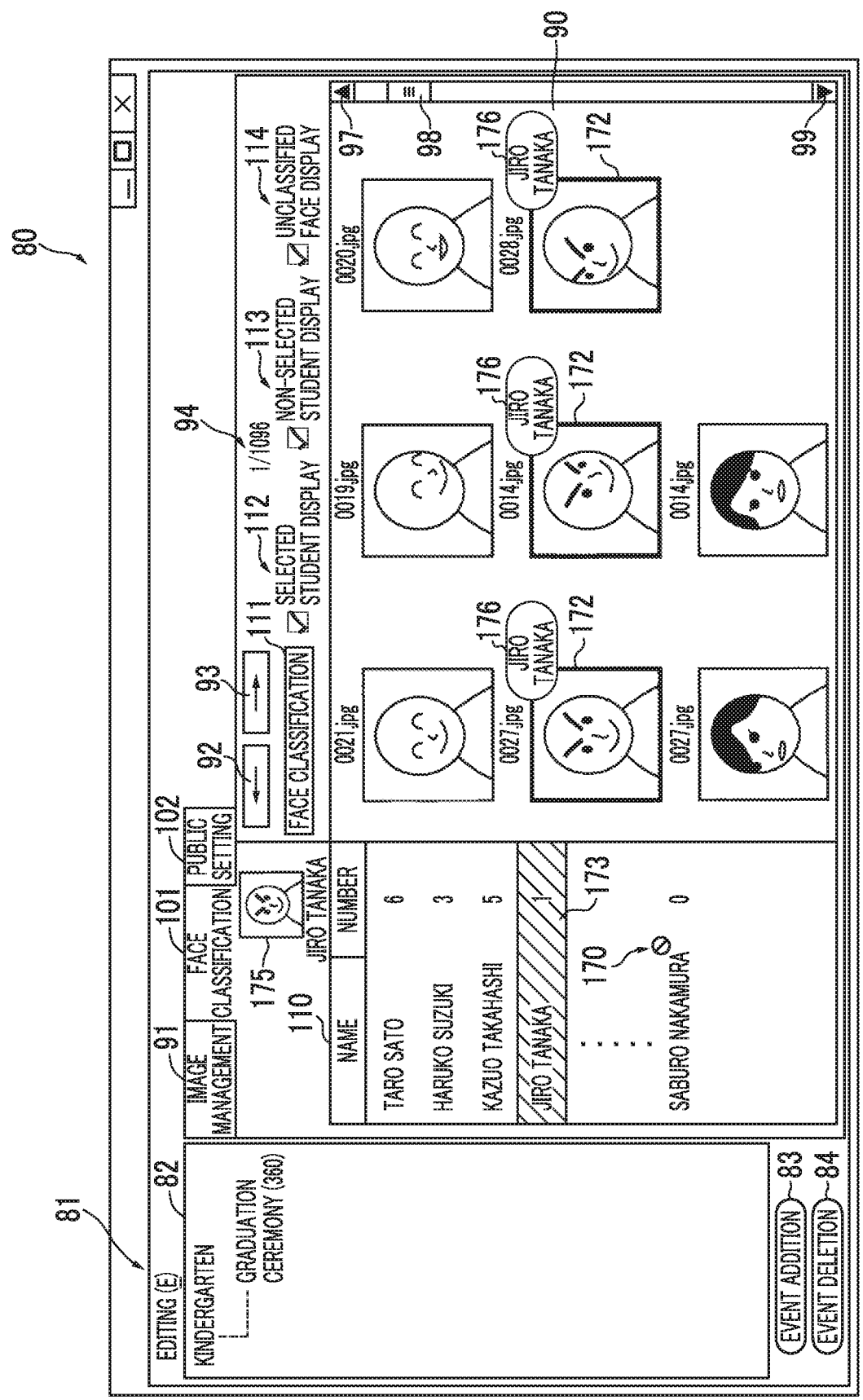
FIG. 23 is a diagram showing an example of an image display window.

FIGS. 21 to 23 are diagrams showing examples of the image display window 80. FIGS. 21 to 23 correspond to the image display window 80 of FIG. 11 or the like, the same reference numerals are given to the same configurations, and description thereof will not be repeated. In the image display windows 80 shown in FIGS. 21 to 23, a plurality of face images of the same person and their names are collectively associated.

The user selects images to be collectively associated with a name using the mouse 9. Specifically, the user drags a cursor 171 on face images to be collectively associated with a name using the mouse 9. Then, a frame of the selected images becomes a thick frame 172. In FIG. 21, it is shown that three images in the second line (central line) are selected from images displayed in three lines in the image display area 90.

Subsequently, the name of the selected face images is selected by the user from names displayed in the subject list area 110. Here, it is assumed that the name of the selected face images is "Jiro TANAKA" and "Jiro TANAKA" is selected. Then, a color around the selected name "Jiro TANAKA" is changed.

FIG. 22 shows a state where the vicinity of the selected name "Jiro TANAKA" is changed. In FIG. 22, the vicinity of the name "Jiro TANAKA" is indicated by hatching 173, so that the vicinity of the selected name "Jiro TANAKA" is changed. Further, a representative face image 175 (registered in advance) of the selected "Jiro TANAKA" is displayed on the subject list area 110. The user compares the representative face image 175 with the face image selected from the face images displayed in the image display area 90, to thereby confirm whether they are the same person. Subsequently, the user moves the cursor 171 on the selected name "Jiro TANAKA", and drags the cursor 171 on the selected face image. Then, the cursor 171 is temporarily changed to a name display area 174 indicating the selected name "Jiro TANAKA". Then, as shown in FIG. 23, a name display area 176 is displayed on each of the selected images.

In FIGS. 21 to 23, a prohibit mark 170 is given to a name of a person who is prohibited from being made public among the names displayed in the subject list area 110. By viewing the prohibit mark 170, it is possible to prevent in advance the name from being accidentally made public.

Further, in FIGS. 21 to 23, images are recognized as face images, but in the case of images in which faces are too sideways or face images are burred, "flags such as "too sideways", "too blurry", "unsuitable for public" may be added to the images. In selecting an image to be disclosed, it is possible to determine whether the image is to be made public or private with reference to such a flag.

Further, the images displayed in the image display area 90 in FIGS. 21 to 23 may be displayed in the order of the number of appearances and the order of imaging times points so that the images are displayed on an upper side as the number of appearances of a subject is larger, and is displayed on a left side as the imaging time point is earlier.

Figure 24:
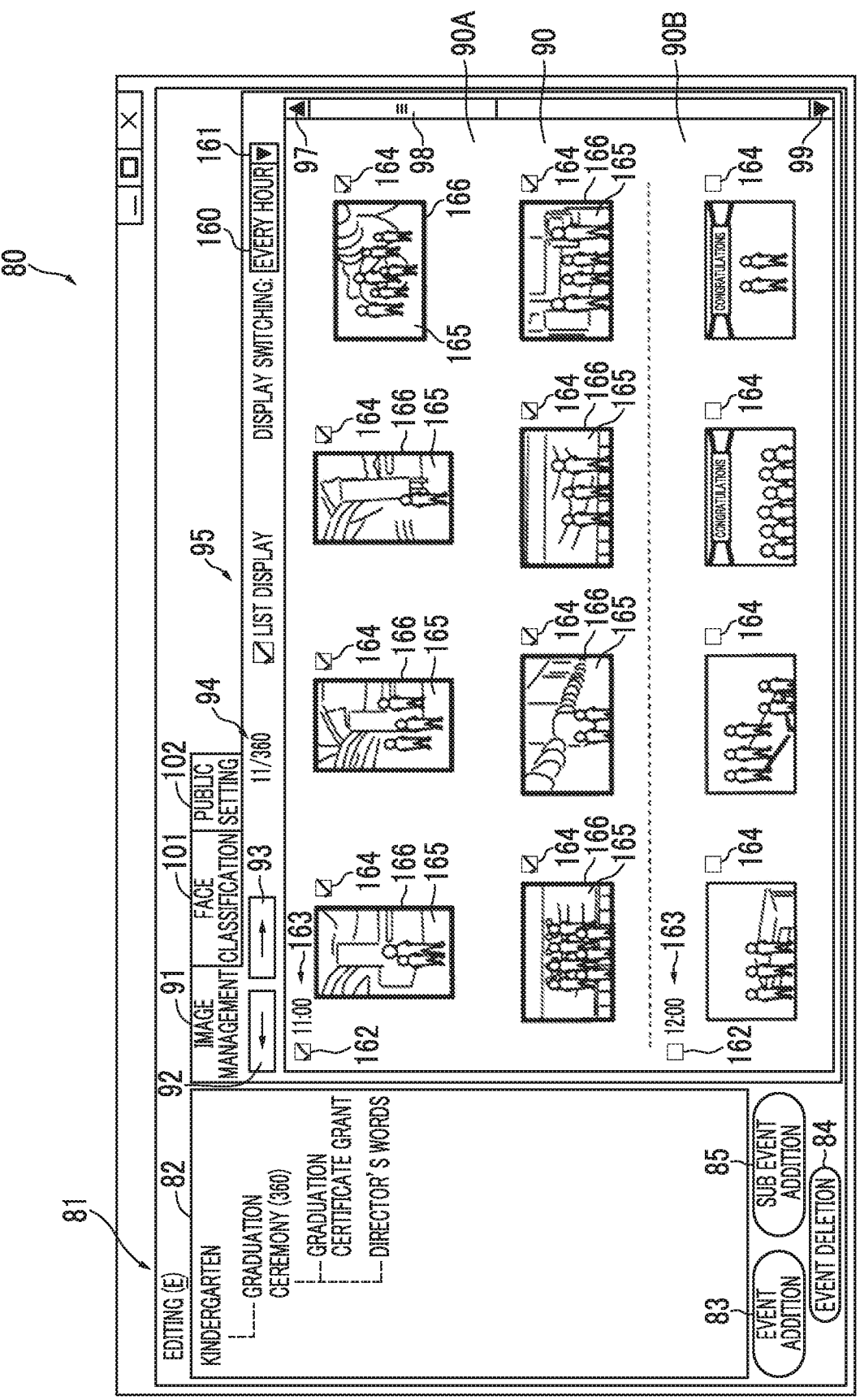
FIG. 24 is a diagram showing an example of an image display window.

FIG. 24 is a diagram showing another example of the image display window 80. In FIG. 24, the same reference numerals are given to the same configurations as those shown in FIG. 8 or the like, and description thereof will not be repeated.

In an event management area 82, a sub event of "graduation certificate grant" and a sub event of "director's words" are generated below the event "graduation ceremony". Images managed as the event "graduation ceremony" are managed as sub events such as "graduation certificate grant" and "director's words". Further, a sub event addition button 85 in which a character string of "add sub event" is included is formed on a right side of an event addition button 83.

For example, in a case where the sub event addition button 85 is clicked after the character string of "graduation ceremony" is clicked, a sub event input window appears on the image display window 80, and the user inputs a new sub event using the sub event input window. At that time, in a case where the user inputs the character string of "graduation certificate grant" using the keyboard 8, the character string of "graduation certificate grant" is displayed below the character string of "graduation ceremony". Similarly, a character string of "director's words" is displayed below the character string of "graduation ceremony".

As the images managed as the event of "graduation ceremony" are dragged and dropped in the image display area 90 in a state where the character string of "graduation certificate grant" is clicked, the dragged and dropped images are managed by the event of "graduation certificate grant". In a case where an event deletion button 84 is clicked after a character string indicating a sub event displayed in the event management area 82 is clicked, the sub event specified by the clicked character string and images managed by the sub event are deleted.

The public setting tab 102 is clicked on the image display window 80 shown in FIG. 24, and thus, multiple images 165 managed by the event with the name of "graduation ceremony" are displayed in the image display area 90.

A display switching pull-down 160 is formed on an upper right side of the image display area 90. The display switching pull-down 160 is used in displaying the images in the image display area 90 to be divided according to imaging times or the like. As the pull-down button 161 is clicked, a plurality of time-date display switching menus such as a section of "1 hour" or a section of "2 hours" appear, and a display division is selected therefrom by the user. Images are displayed in the image display area 90 in accordance with the display division designated by the display switching pull-down 160.

It is assumed that the section of 1 hour is selected by the display switching pull-down 160. Then, the image display area 90 is divided every hour. In FIG. 24, a first image display area 90A and a second image display area 90B appear. The first image display area 90A and the second image display area 90B are divided by a broken line, but may be divided by other methods. Areas other than the image display areas 90A and 90B also appear in the image display area 90 by moving a slide bar 98.

A display time 163 displayed in the first image display area 90A is displayed in an upper left portion of the first image display area 90A. In FIG. 24, characters of "11:00" are displayed as the display time 163. Since the display division is the section of 1 hour, images captured at a time slot of 11:00 among images managed by the event or the like displayed in the event management area 82 are displayed in the first image display area 90A.

A check box 162 is formed on a left side of the display time 163, and a check box 164 is formed on an upper right side of an image 165 displayed in the first image display area 90A. Both the check boxes 162 and 164 are provided to designate publication of the image. In a case where the check box 162 formed on the left side of the display time 163 is checked, the check box 164 formed on the upper right side of the image 165 (all images 165 displayed in the first image display area 90A) specified by the display time 163 is checked, and publication of the image 165 is designated. In a case where the check box 164 formed on the upper right side of the image 165 is checked, publication of the checked image is designated. In a case where the check box 164 formed on the upper right side of the image 165 is unchecked, the image is set to be private. In a case where the check box 164 is checked, the vicinity of the image 165 is surrounded by a thick frame 166. This is performed to easily distinguish an image for which the check box 164 is checked and an image for which the check box 164 is not checked. Instead, a color of the frame may be changed.

A character string of "12:00" is displayed in the display time 163 of the second image display area 90B, and images 165 captured at a time slot of 12:00 are displayed in the second image display area 90B. The check box 162 is formed on a left side of the display time 163, and the check box 164 is on an upper right side of the image 165. By checking the check box 162 or 164, the checked image is made public in the same manner as described for the images displayed in the first image display area 90A.

Figure 25:
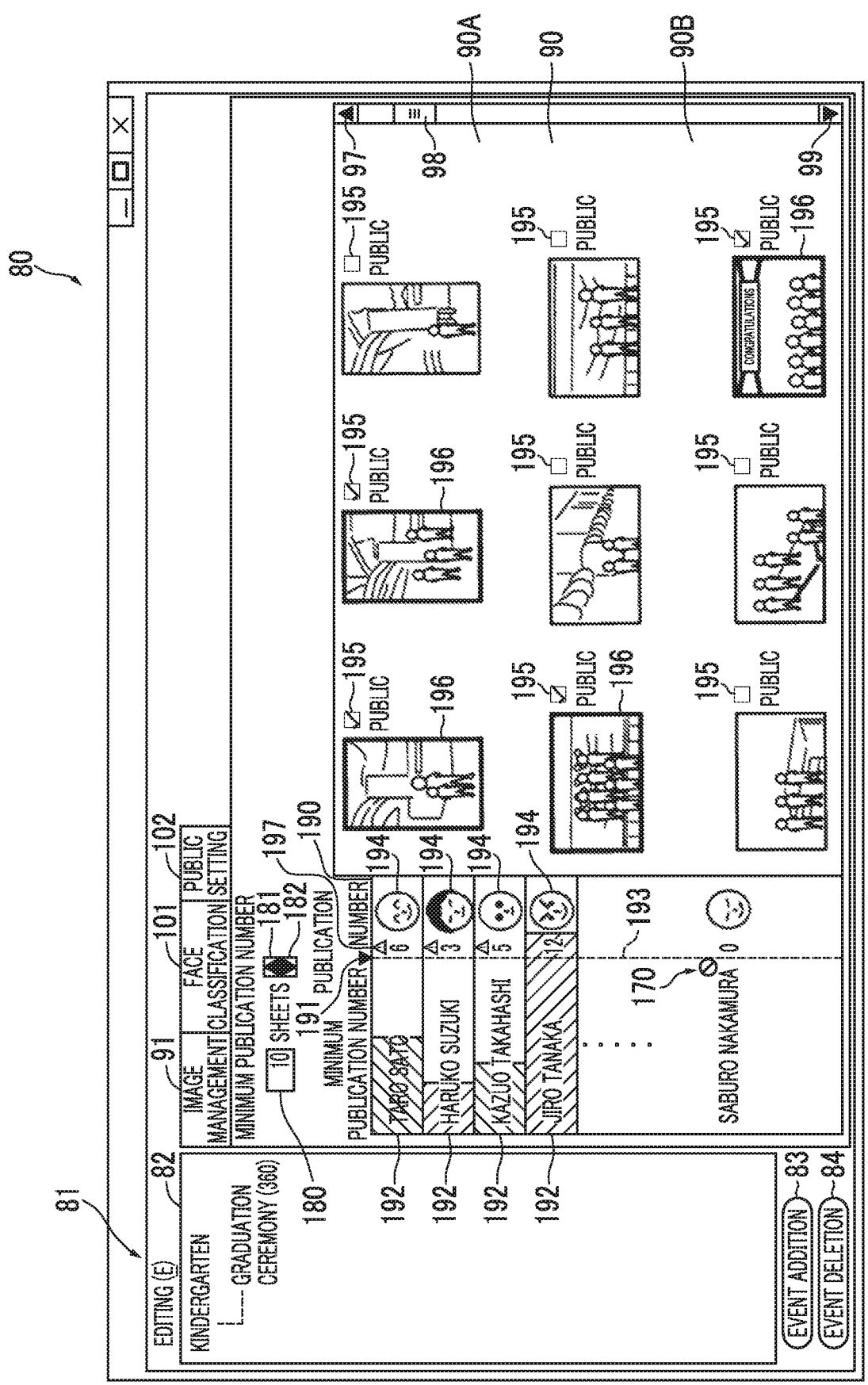
FIG. 25 is a diagram showing an example of an image display window.

FIG. 25 is an example showing another example of the image display window 80. In FIG. 25, the same reference numerals are given to the same configurations as those shown in FIG. 8 or the like.

The check boxes 195 are also formed on the upper right sides of the images displayed in the image display area 90 of the image display window 80 shown in FIG. 25, and as the check boxes 195 are checked, corresponding images are set to be made public. An image for which the check box 195 is checked is surrounded by the thick frame 196. In a case where the check box 195 is not checked, the image is set to be private.

A minimum publication number setting area 180 is formed on a left side of the image display area 90. The minimum publication number setting area 180 is provided to set a minimum number of images to be made public. An up arrow button 181 and a down arrow button 182 are formed on a right side of the minimum publication number setting area 180. Whenever the up arrow button 181 is clicked, a numeral displayed in the minimum publication number setting area 180 is increased one by one, and whenever the down arrow button 182 is clicked, the numeral displayed in the minimum publication number setting area 180 is decreased one by one.

A publication number display area 190 is formed on a left side of the image display area 90. The publication number display area 190 is provided to display the number of images to be made public in correspondence with names of persons included in the images to be made public.

In the publication number display area 190, a name of a subject included in an image (for example, Taro SATO), a publication number (for example, 6), and a representative face image 194 of the subject are displayed. Further, in the publication number display area 190, a mark 191 and a line 193 that serve as a guideline for the minimum publication number set in the minimum publication number setting area 180 are also displayed. In addition, a publication number for each name of a subject is indicated by a bar graph (indicated by hatching) 192. As the publication number is smaller, the length of the bar graph 192 is shorter, and as the publication number is larger, the length of the bar graph 192 is longer. As the bar graph 192 extends further rightward, it shows that the publication number is greater. In a case where a right end of the bar graph 192 does not exceed the line 193, the publication number of subject indicated by the bar graph 192 does not reach the minimum publication number, in a case where the right end of the bar graph 192 reaches the line 193, the publication number of the subject indicated by the bar graph 192 coincides with the minimum publication number, and in a case where the right end of the bar graph 192 exceeds the line 193, the publication number of the subject indicated by the bar graph 192 exceeds the minimum publication number. By checking whether or not the right end of the bar graph 192 exceeds the line 193, it is possible to check whether or not the setting is made so that images of the minimum publication number or greater are disclosed, for each subject.

In addition, a mark 197 for calling attention of the user is displayed on the name of the subject corresponding to the image that does not reach the minimum publication number. By viewing the mark 197, images to be made public are selected so as to reach the minimum publication number. A configuration in which the color of the name of the subject corresponding to the image that does not reach the minimum publication number and the color of the name of the subject corresponding to the image that reaches the minimum publication number are changed may be used. Further, the prohibit mark 170 is also displayed in correspondence with the name displayed in the publication number display area 190. It is possible to prevent in advance an image including a private subject from being erroneously set as a public target.

Figure 26:
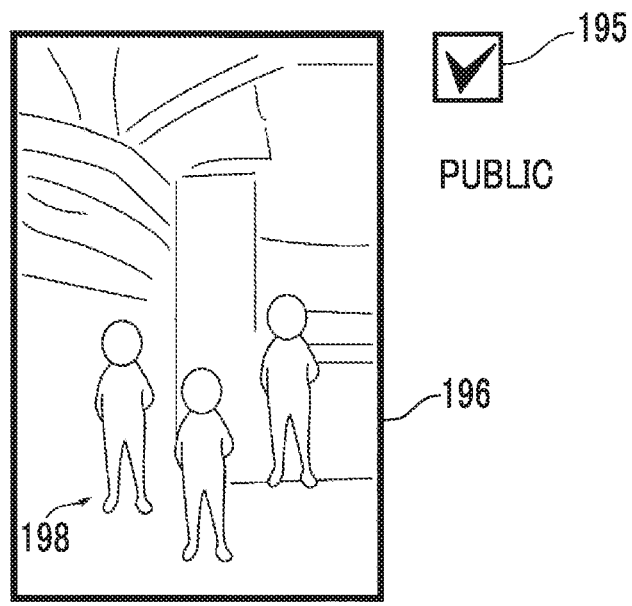
FIG. 26 is a diagram showing an example of an image.

FIG. 26 is a diagram showing an example of an image set as a public target as the check box 195 is checked, for example.

It is assumed that a private subject 198 is included in an image set as a public target. In such a case, the private subject 198 is trimmed from the images. The private subject 198 is removed from the public images.

Figure 27:
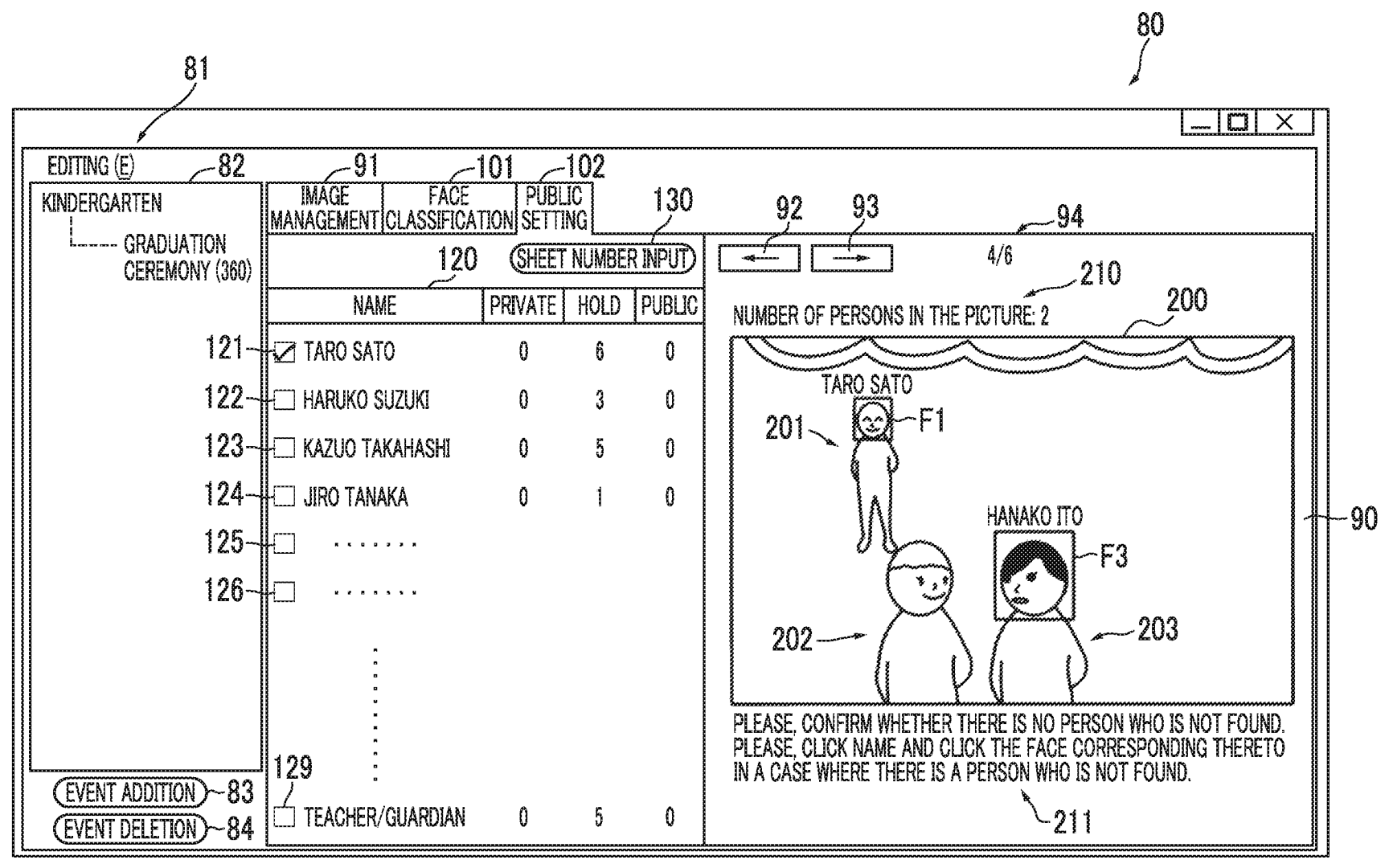

FIG. 27 is a diagram showing another example of the image display window 80.

An image 200 is displayed in the image display area 90. The image 200 includes three persons of subjects 201, 202, and 203. In a case where the image 200 includes the subjects 201, 202, and 203, face images of the subjects 201, 202, and 203 are respectively recognized, and the face images corresponding to the subjects 201, 202, and 203 should be detected. However, there is a case where face images corresponding to the number of subjects are not detected. For example, the face image of the subject 201 is detected and the face frame F1 is displayed and the face image of the subject 203 is detected and the face frame F3 is displayed, but the face image of the subject 202 may not be displayed.

A subject detection number 210 is displayed above the image 200. Two persons are displayed as the number of subjects detected from the image 200. A confirm message 211 indicating whether the number of persons detected from the image 200 is correct is displayed below the image. By viewing the confirm message, the user can recognize that the face that is not detected is included in the image 200. For example, by selecting a name corresponding to a name of the subject 202 of the face that is not detected, for example, from the names displayed in the public/private information display area 120 and clicking the corresponding face, the selected name and the image 200 are associated with each other.

A variety of processing units that execute the above-described processes may include the CPU 2 that executes software to function as the variety of processing units, or may include a programmable logic device of which a circuit configuration is changeable after manufacturing, such as a field-programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the variety of processors described above, or may be configured by a combination of the same type or different types of two or more processors (for example, a combination of plural FPGAs or a combination of a CPU and an FPGA). As an example in which the plurality of processing units are configured by one processor, first, as represented by a computer such as a client computer or a server, a configuration in which a combination of one or more CPUs and software forms one processor and this processor functions as a plurality of processing units may be employed. Second, as represented by a system on chip (SoC) or the like, a configuration in which a processor for realizing entire functions of a system including a plurality of processing units using one integrated circuit (IC) chip is used may be employed. As described above, the various processing units are configured using one or more of various processors as a hardware structure.

Further, the hardware structure of the variety of processors is, more specifically, electric circuitry in which circuit elements such as semiconductor elements are combined.

The image candidate determination apparatus may be configured by a personal computer, may be configured by a so-called smart device such as a smartphone or a tablet device, or may be configured by a mobile phone such as a feature phone.

EXPLANATION OF REFERENCES

1: Image candidate determination apparatus
2: CPU
3: Display device
4: Communication device
5: Hard disk
6: Hard disk drive 7: Memory
8: Keyboard
9: Mouse
10: Compact disc drive
11: Compact disc
12: Memory card reader/writer
13: Memory card
80: Image display window
81: Character string
82: Event management area
83: Event addition button
84: Event deletion button
90: Image display area
91: Image management tab
92: Left arrow button
93: Right arrow button
94: Image specifying number
95: Character string
96: Character string
97: Up arrow button
98: Slide bar
99: Down arrow button
101: Face classification tab
102: Public setting tab
110: Subject list area
111: Face classification button
112: Character string
113: Character string
114: Character string
120: Public/private information display area
121-126: Check box
129: Check box
130: Sheet number input button
140: Extraction sheet number input window
141: Minimum sheet number input area
142: Maximum sheet number input area
143: Enter button
150: Imaging instruction window
151: Confirm button
160: Display switching pull-down
161: Pull-down button
162: Check box
163: Display time
164: Check box
165: Image
166: Thick frame
170: Prohibit mark
171: Cursor
172: Thick frame
173: Hatching
174: Name display area
175: Face image
176: Name display area
180: Minimum publication number setting area
181: Up arrow button
182: Down arrow button
190: Publication number display area
191: Mark
192: Bar graph
193: Line
194: Face image
195: Check box
196: Thick frame
197: Mark
198: Subject
200: Image
201-203: Subject
210: Subject detection number
211: Confirm message
F: Face frame
F1-F6: Face frame
G1-G3: Face image group

What is claimed is:

1. An image candidate determination apparatus comprising:
a processor configured to
receive a plurality of images and group one or more images in which the same person is included as grouped images, and
determine at least one extraction image candidate or at least one non-extraction image candidate from the grouped images, on the basis of a total image evaluation value and a limit value of an extraction number of images in which the same person is included,
wherein the total image evaluation value is calculated for each image on the basis of a person image evaluation value calculated for each person who appears in the images.

2. The image candidate determination apparatus according to claim 1,
wherein the processor is configured to display the extraction image candidate or the non-extraction image candidate on a display screen.

3. The image candidate determination apparatus according to claim 1,
wherein the person image evaluation value is calculated on the basis of an evaluation value relating to at least a face,
wherein the processor is configured to extract a face image portion from each of a plurality of images,
group the face image portions for each face image portion of the same person as the grouped images, and
determine the extraction image candidate or the non-extraction image candidate from the grouped images, on the basis of the total image evaluation value and the limit value of the extraction number of images in which the same person is included.

4. The image candidate determination apparatus according to claim 2,
wherein the person image evaluation value is calculated on the basis of an evaluation value relating to at least a face,
wherein the processor is configured to
extract a face image portion from each of a plurality of images as the grouped images,
group the face image portions for each face image portion of the same person, and
determine the extraction image candidate or the non-extraction image candidate from the grouped images, on the basis of the total image evaluation value and the limit value of the extraction number of images in which the same person is included.

5. The image candidate determination apparatus according to claim 1,
wherein the processor is configured to correct the person image evaluation value using a correction coefficient for setting the person image evaluation value to be larger as the number of images in which the same person is included is smaller.

6. The image candidate determination apparatus according to claim 2,
wherein the processor is configured to correct the person image evaluation value using a correction coefficient for setting the person image evaluation value to be larger as the number of images in which the same person is included is smaller.

7. The image candidate determination apparatus according to claim 1,
wherein the processor is configured to display a number of images for each person included in the extraction image candidate or the non-extraction image candidate on the display screen.

8. The image candidate determination apparatus according to claim 2,
wherein the processor is configured to
determine at least one extraction image or at least one non-extraction image from the extraction image candidate displayed on the display screen, or
determine at least one non-extraction image or at least one extraction image from the non-extraction image candidate displayed on the display screen.

9. The image candidate determination apparatus according to claim 8, further comprising:
a display that notifies the number of the at least one extraction image or the number of the at least one non-extraction image, for each person included in the images.

10. The image candidate determination apparatus according to claim 8,
wherein the image candidate determination apparatus further comprises: a display that updates and notifies the number of at least one extraction image or the number of at least one non-extraction image for each person included in the images in accordance with the determination of the extraction images or the non-extraction images.

11. The image candidate determination apparatus according to claim 1,
wherein the processor is configured to exclude, in a case where an extraction number of images in which a specific person is included deviates from a limit value as one non-extraction image candidate becomes a non-extraction image or one extraction image candidate becomes an extraction image, the one non-extraction image candidate or the one extraction image candidate from the non-extraction image candidate or the extraction image candidate.

12. The image candidate determination apparatus according to claim 1,
wherein the processor is configured to regard non-same person as the same person for adults, and group the one or more images in which the same person is included.

13. The image candidate determination apparatus according to claim 1,
wherein the processor is configured to calculate a lower person image evaluation value as the number of persons included in an image is larger.

14. The image candidate determination apparatus according to claim 1,
wherein the processor is configured to determine, on the basis of the total image evaluation value and the limit value of the extraction number of images in which the same person is included, the extraction image candidate or the non-extraction image candidate from the grouped images so that an extraction number of images in which the same person is included is within the limit value.

15. The image candidate determination apparatus according to claim 1,
wherein the processor is configured to
detect a person for which the number of the same person included in the grouped images is equal to or smaller than a threshold value as a detected person, and
perform an imaging instruction of the detected person.

16. An image candidate determination method comprising:
receiving a plurality of images and grouping one or more images in which the same person is included as grouped images; and
determining at least one extraction image candidate or at least one non-extraction image candidate from the grouped images, on the basis of a total image evaluation value and a limit value of an extraction number of images in which the same person is included,
wherein the total image evaluation value is calculated for each image on the basis of a person image evaluation value calculated for each person who appears in the images.

17. A non-transitory computer-readable recording medium storing a program for controlling a computer of an image candidate determination apparatus to execute:
receiving a plurality of images and grouping one or more images in which the same person is included as grouped images; and
determining at least one extraction image candidate or at least one non-extraction image candidate from the grouped images, on the basis of a total image evaluation value and a limit value of an extraction number of images in which the same person is included,
wherein the total image evaluation value is calculated for each image on the basis of a person image evaluation value calculated for each person who appears in the images.

* * * * *